(12) United States Patent
Wang et al.

(10) Patent No.: US 11,577,600 B2
(45) Date of Patent: Feb. 14, 2023

(54) MOTOR, MOTOR COOLING SYSTEM, AND ELECTRIC VEHICLE

(71) Applicant: Huawei Digital Power Technologies Co., Ltd., Shenzhen (CN)

(72) Inventors: Jiangang Wang, Dongguan (CN); Quanming Li, Dongguan (CN); Tingyu Xie, Dongguan (CN); Yibo Wang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/466,137

(22) Filed: Sep. 3, 2021

(65) Prior Publication Data

US 2021/0394611 A1    Dec. 23, 2021

Related U.S. Application Data

(63) Continuation of application No. PCT/CN2020/081148, filed on Mar. 25, 2020.

(30) Foreign Application Priority Data

Jun. 4, 2019    (CN) .......................... 201910480166.0

(51) Int. Cl.
*B60K 11/02* (2006.01)
*B60L 3/00* (2019.01)
(Continued)

(52) U.S. Cl.
CPC ............ *B60K 11/02* (2013.01); *B60L 3/0061* (2013.01); *H02K 9/19* (2013.01);
(Continued)

(58) Field of Classification Search
CPC .... B60K 11/02; B60K 2001/006; H02K 9/19; H02K 1/20; H02K 5/203; B60L 3/0061;
(Continued)

(56) References Cited

U.S. PATENT DOCUMENTS 8,648,504 B2 *  2/2014  Okada ...................... H02K 1/20
                                                          310/58
8,963,384 B2 *  2/2015  Kirkley, Jr ............... H02K 3/24
                                                          310/58
(Continued)

FOREIGN PATENT DOCUMENTS

CN       201594780 U       9/2010
CN       102165673 A       8/2011
(Continued)

OTHER PUBLICATIONS

Ma Ping et al.,"Design of the heat exchanger wi th oil and water for the high speed motorized spindle",Modular Machine Tool and Automatic Manufacturing Technique,2004,with an English abstract-,total 3 pages.

*Primary Examiner* — Alex W Mok
(74) *Attorney, Agent, or Firm* — Rimon PC

(57) ABSTRACT

This application provides a motor, including a stator core and a motor housing provided with a distribution groove, a liquid inlet channel, and a liquid outlet channel. The distribution groove is provided on an inner wall of the motor housing, the liquid inlet channel is in communication with the distribution groove and an outer space of the motor housing, and the liquid outlet channel is in communication with an inner cavity and the outer space of the motor housing. An outer wall of the stator core is provided with a stator groove. The stator groove is in communication with both the distribution groove and the liquid outlet channel. The liquid inlet channel, the distribution groove, the stator groove, and the liquid outlet channel are in communication to form a coolant channel.

18 Claims, 19 Drawing Sheets

(51) Int. Cl.
*H02K 9/19* (2006.01)
*B60K 1/00* (2006.01)

(52) U.S. Cl.
CPC ..... *B60K 2001/006* (2013.01); *B60L 2240/36* (2013.01); *B60L 2240/425* (2013.01)

(58) Field of Classification Search
CPC ........... B60L 2240/36; B60L 2240/425; Y02T 10/64
USPC ............................................................ 310/54
See application file for complete search history.

(56) References Cited

U.S. PATENT DOCUMENTS

| | | | |
|---|---|---|---|
| 9,614,417 B2 * | 4/2017 | Lee | H02K 9/19 |
| 9,917,486 B2 * | 3/2018 | Kirkley, Jr | H02K 5/203 |
| 2003/0042806 A1 | 3/2003 | Inaba et al. | |
| 2016/0013704 A1 * | 1/2016 | Wagner | H02K 7/003 |
| | | | 310/54 |
| 2017/0271956 A1 | 9/2017 | Hanumalagutti et al. | |

FOREIGN PATENT DOCUMENTS

| | | |
|---|---|---|
| CN | 201994738 U | 9/2011 |
| CN | 202550715 U | 11/2012 |
| CN | 204858766 U | 12/2015 |
| CN | 205004871 U | 1/2016 |
| CN | 206211715 U | 5/2017 |
| CN | 109599968 A | 4/2019 |
| CN | 110266127 A | 9/2019 |
| DE | 102015014838 A1 | 7/2016 |
| DE | 102016200081 A1 | 7/2017 |
| EP | 2230719 A1 | 9/2010 |
| JP | S51018902 U | 2/1976 |
| JP | 2010088287 A | 4/2010 |
| JP | 6163071 B2 | 7/2017 |
| WO | 2018153001 A1 | 8/2018 |

* cited by examiner

30

MOTOR, MOTOR COOLING SYSTEM, AND ELECTRIC VEHICLE

CROSS-REFERENCE TO RELATED APPLICATIONS

This application is a continuation of International Application No. PCT/CN2020/081148, filed on Mar. 25, 2020, which claims priority to Chinese Patent Application No. 201910480166.0, filed on Jun. 4, 2019. The disclosures of the aforementioned applications are hereby incorporated by reference in their entireties.

TECHNICAL FIELD

This application relates to the field of electric vehicle technologies, and in particular, to a motor, a motor cooling system, and an electric vehicle.

BACKGROUND

A heat dissipation technology is one of the key technologies for miniaturization of a motor of an electric vehicle. Whether the motor can dissipate heat well directly affects operation reliability of the motor and vehicle performance. The motor includes a stator, and a corresponding heat dissipation design generally needs to be made for the stator. However, a stator of a conventional motor has relatively poor heat dissipation efficiency.

SUMMARY

Embodiments of this application provide a motor, a motor cooling system, and an electric vehicle, to improve heat dissipation efficiency of a stator of the motor.

According to a first aspect, an embodiment of this application provides a motor, including a motor housing and a stator core mounted in the motor housing. The motor housing is provided with a distribution groove, a liquid inlet channel, and a liquid outlet channel, the distribution groove is provided on an inner wall of the motor housing, the liquid inlet channel is in communication with the distribution groove and an outer space of the motor housing, and the liquid outlet channel is in communication with an inner cavity of the motor housing and the outer space of the motor housing; and an outer wall of the stator core is provided with a stator groove, an extension direction of the stator groove intersects an extension direction of the distribution groove, and opposite ends of the stator groove in the extension direction are both closed; the stator groove is in communication with both the distribution groove and the liquid outlet channel; and the liquid inlet channel, the distribution groove, the stator groove, and the liquid outlet channel are in communication to form a coolant channel.

In this embodiment, the distribution groove, the liquid inlet channel, and the liquid outlet channel are provided on the motor housing, and the outer wall of the stator core is provided with the stator groove, so that the liquid inlet channel, the distribution groove, the stator groove, and the liquid outlet channel are in communication with each other to form the coolant channel. Since the outer wall of the stator core is provided with the stator groove, a contact area between coolant and the stator core is increased, so that the coolant can fully come into contact with the stator core, thereby reducing a contact thermal resistance between the coolant and the stator core, and improving heat dissipation efficiency of the stator core. The opposite ends of the stator groove in the extension direction are both closed, so that the coolant can only flow out through the liquid outlet channel instead of flowing out from the opposite ends of the stator groove, it is ensured that a region that is on the stator core and on which heat needs to be dissipated is well dissipated, a defect that heat of the stator core cannot be evenly dissipated due to a rapid loss of the coolant through the opposite ends of the stator groove (especially when there are a plurality of stator grooves, if opposite ends of each stator groove are open, the coolant is continuously lost when flowing through the previous stator grooves, and the coolant may not be distributed to the subsequent stator grooves, causing a heat dissipation failure on a region that is on the stator core and on which the stator grooves are located) is avoided, and it can be avoided that a power output of the motor is affected by the rotor losing kinetic energy due to a large amount of coolant flowing out from the opposite ends of the stator groove and coming into contact with the rotor. In addition, the coolant channel is constructed in a grid form by intersecting the extension directions of the distribution groove and the stator groove, which is a channel structure design that takes into full consideration a manufacturing process of the product, and meets a manufacturing requirement of the motor. Particularly, the distribution groove is designed to extend along the circumferential direction, and the distribution groove in the circumferential direction can be easily machined on the inner wall of the motor housing by a process such as casting. The stator groove is designed to extend along the axial direction, only a notch needs to be provided on an edge of a sheet-shaped single iron core, several such iron cores are sequentially laminated during assembly, and the notches are aligned to obtain the stator groove, so that the several iron cores have a same design structure and can adopt a same machining process, thereby greatly simplifying design and manufacturing costs. In addition, the channels are dispersed in the stator core and the motor housing instead of all concentrated in the motor housing, so that a defect that a thickness of the motor housing is greatly increased due to a large quantity of channels provided on the motor housing can be avoided (to ensure strength of the motor housing while providing the channels, the thickness of the motor housing needs to be increased accordingly), and the motor housing can be made as thin as possible and costs are reduced.

In a first implementation, the distribution groove includes two first distribution grooves and two second distribution grooves; in an axial direction of the stator core, the two first distribution grooves are both located between the two second distribution grooves, and the two second distribution grooves are spaced apart; in a circumferential direction of the stator core, each first distribution groove is spaced from the two second distribution grooves; the liquid inlet channel is in communication with one first distribution groove and the outer space of the motor housing; three stator grooves are sequentially spaced apart along the circumferential direction, and an extension direction of at least a part of the stator groove intersects an extension direction of at least a part of the distribution groove; and the first distribution groove in communication with the liquid inlet channel is in communication with the two second distribution grooves through one stator groove, the two second distribution grooves are in communication with the other first distribution groove through one stator groove, and the other first distribution groove is in communication with the liquid outlet channel through one stator groove, to form a coolant channel, so that coolant sequentially flows into the liquid inlet channel, the first distribution groove, the first stator groove, the two second distribution grooves, the second stator groove, the other first distribution groove, the third stator groove, and the liquid outlet channel.

In this first implementation, the liquid inlet channel, one first distribution groove, the first stator groove, the two second distribution grooves, the second stator groove, the other first distribution groove, the third stator groove, and the two liquid outlet channels are sequentially in communication to form a channel. The coolant flows into an inner cavity of the motor housing from the liquid inlet channel, and sequentially flows into one first distribution groove, the first stator groove, the two second distribution grooves, the second stator groove, the other first distribution groove, and the third stator groove, and finally flows out from the stator core through the two liquid outlet channels. When there are other quantities of the first distribution grooves, the second distribution grooves, and the stator grooves, the coolant circulates based on the flow order of the first distribution groove-the stator groove-the second distribution groove-the stator groove-the first distribution groove. From the overall flow trend, the coolant flows unidirectionally (for example, clockwise or counterclockwise) on the inner wall of the motor housing. When the coolant flows in the stator groove, the stator core may be cooled by heat exchange. After flowing out from the stator core through the two liquid outlet channels, the coolant may be sprayed to opposite ends of a stator winding to further dissipate heat for the stator winding. Since the first distribution groove is located between two ends of the stator groove, when the coolant enters the stator groove from the first distribution groove, the coolant may flow from a middle portion of the stator groove to the two ends of the stator groove. Since the two second distribution grooves are located at the opposite ends of the stator groove, when the coolant enters the stator groove from the two second distribution grooves, the coolant may flow from the two ends of the stator groove to the middle portion of the stator groove. The channel design can ensure that the coolant is smoothly linked between the inner wall of the motor housing and the outer wall of the stator core, and ensure that the coolant can completely cover the outer wall of the stator core, thereby ensuring the heat dissipation efficiency. In addition, one liquid inlet channel is designed so that the coolant flows in from one inlet in a centralized manner, thereby simplifying the design of the liquid inlet channel of the motor housing, and facilitating accurate control on a flow direction of the coolant, to achieve an expected heat dissipation effect.

In a second implementation, in the axial direction of the stator core, opposite ends of the stator core are both recessed within the motor housing, and one end of the liquid outlet channel extends beyond the stator core; the inner wall of the motor housing is provided with a liquid return groove, opposite ends of the liquid return groove in an extension direction both extend beyond the stator core, and the liquid return groove is used to receive coolant flowing out from the liquid outlet channel and serve as a channel for delivering the coolant to a heat exchanger; and the liquid inlet channel and the first distribution groove in communication with the liquid inlet channel are both spaced from the liquid return groove. By providing the liquid return groove, the coolant can be delivered to the heat exchanger for cooling. A temperature of the cooled coolant decreases and the coolant may be reused for heat dissipation. In addition, the liquid inlet channel and the first distribution groove in communication with the liquid inlet channel are both spaced from the liquid return groove, so that it can be avoided that heat dissipation is affected by higher-temperature coolant contained in the liquid return groove being mixed with lower-temperature coolant in the liquid inlet channel and the distribution groove in communication with the liquid inlet channel.

In a third implementation, there are several first distribution grooves, several second distribution grooves, and several stator grooves; and the several first distribution grooves are spaced apart along the circumferential direction of the stator core, two second distribution grooves are provided between every two first distribution grooves, and each first distribution groove and two second distribution grooves adjacent to the first distribution groove are in communication through one stator groove; and the two first distribution grooves in the several first distribution grooves are respectively located on the opposite ends of the liquid return groove, where one first distribution groove is spaced from the liquid return groove, and the other first distribution groove is in communication with the liquid return groove. In this implementation, the coolant enters the first distribution groove in communication with the liquid inlet channel from the liquid inlet channel, and sequentially flows into the stator groove, the two second distribution grooves, the stator groove, the first distribution groove, the stator groove, and the two second distribution grooves. This circulates until the coolant flows into the stator groove in communication with the liquid outlet channel. In this case, the coolant is divided into two paths, where one path flows out from the stator core through the liquid outlet channel and enters the liquid return groove, and the other path continues to flow into the subsequent first distribution groove or the subsequent second distribution groove from the stator groove along the original flow direction and flow order until flowing into the first distribution groove in communication with the liquid return groove and merges into the liquid return groove. In this implementation, since the first distribution groove in communication with the liquid inlet channel is spaced from the liquid return groove, the lower-temperature coolant entering the motor housing is not mixed with the higher-temperature coolant in the liquid return groove, thereby ensuring the heat dissipation effect. In addition, the coolant on the inner wall of the motor housing flows unidirectionally, thereby simplifying a channel design of the motor housing, facilitating accurate control on a flow direction of the coolant, and achieving an expected heat dissipation effect.

In a fourth implementation, the motor includes two channels, the liquid inlet channel and the first distribution groove that are in communication in one channel are spaced from the liquid inlet channel and the first distribution groove that are in communication in the other channel, and the two channels share the third stator groove and the liquid outlet channel, so that the coolant flowing on the inner wall of the motor housing flows into two paths along opposite directions.

In this embodiment, on the inner wall of the motor housing, from the first distribution groove in communication with the liquid inlet channel, the two channels extend along opposite directions respectively and finally merge. The coolant flows into the motor housing from the two liquid inlet channels. The two paths of coolant flowing on the inner wall of the motor housing flow along opposite directions (one path clockwise and the other path counterclockwise) respectively, finally merge into the third stator groove, and flow out through the two liquid outlet channels. For each of the two channels, the coolant flows in the flow order described in the first implementation. To be specific, the coolant sequentially flows into the liquid inlet channel, one first distribution groove, the first stator groove, the two second distribution grooves, the second stator groove, the other first distribution groove, and the third stator groove, and finally flows out from the stator core through the two liquid outlet channels. Two parallel channels (the "channel" herein refers to the channel formed by the first distribution groove and the second distribution groove) are designed on the motor housing, so that the coolant flows along opposite directions respectively in the two parallel channels, and the coolant can be distributed into the stator groove more rapidly, to achieve rapid heat dissipation of the stator core.

In a fifth implementation, the two channels of the motor still merge, but the two channels have different configurations. Specifically, one channel may be the same as the channel in the third implementation, but the other channel includes one liquid inlet channel, one first distribution groove, one stator groove, and two second distribution grooves, and the two second distribution grooves are in communication with the third stator groove in the previous channel. In this implementation, a channel design solution of the motor is developed, and heat dissipation requirements of motors with different structures can be met.

In a sixth implementation, in the axial direction of the stator core, opposite ends of the stator core are both recessed within the motor housing, and one end of the liquid outlet channel extends beyond the stator core; the inner wall of the motor housing is provided with a liquid return groove, opposite ends of the liquid return groove in an extension direction both extend beyond the stator core, and the liquid return groove is used to receive coolant flowing out from the liquid outlet channel and serve as a channel for delivering the coolant to a heat exchanger; and the liquid inlet channel and the first distribution groove that are in communication in one channel are spaced apart on one side of the liquid return groove, and the liquid inlet channel and the first distribution groove that are in communication in the other channel are spaced apart on the other side of the liquid return groove. By providing the liquid return groove, the coolant can be delivered to the heat exchanger for cooling. A temperature of the cooled coolant decreases and the coolant may be reused for heat dissipation. In addition, the liquid inlet channel and the first distribution groove in communication with the liquid inlet channel are both spaced from the liquid return groove, so that it can be avoided that heat dissipation is affected by higher-temperature coolant contained in the liquid return groove being mixed with lower-temperature coolant in the liquid inlet channel and the distribution groove in communication with the liquid inlet channel.

In a seventh implementation, the distribution groove includes a first distribution groove and a second distribution groove, where the first distribution groove and the second distribution groove are both around an axis of the stator core, and are spaced apart on opposite ends of the inner wall along the axis direction; the first distribution groove is in communication with the second distribution groove through the stator groove, and the extension direction of the stator groove intersects an extension direction of at least one of the first distribution groove and the second distribution groove; the liquid inlet channel is in communication with one end of the first distribution groove and the outer space of the motor housing, so that coolant enters the first distribution groove through the liquid inlet channel, flows into the stator groove while flowing in the first distribution groove, and flows into the second distribution groove and the liquid outlet channel through the stator groove.

In this seventh implementation, the liquid inlet channel, the first distribution groove, the stator groove, the second distribution groove, and the liquid outlet channel are sequentially in communication to form a coolant channel. When entering the first distribution groove from the liquid inlet channel, the coolant flows into each stator groove while flowing in the first distribution groove, and flows into the second distribution groove through each stator groove. In the first distribution groove and the second distribution groove, the coolant flows unidirectionally from one end to the other end. When flowing into the stator groove in communication with the liquid outlet channel, the coolant flows out from the stator core through the liquid outlet channel. When the coolant flows in the stator groove, the stator core may be cooled by heat exchange. After flowing out from the stator core through the liquid outlet channel, the coolant may be sprayed to an end portion of the stator winding to further dissipate heat for the stator winding. In this implementation, a brand-new channel design solution is developed, which not only has the technical effects of the foregoing implementations, but also can meet heat dissipation requirements of motors with different structures.

In an eighth implementation, in an axial direction of the stator core, opposite ends of the stator core are both recessed within the motor housing, and one end of the liquid outlet channel extends beyond the stator core; the inner wall of the motor housing is provided with a liquid return groove, opposite ends of the liquid return groove in an extension direction both extend beyond the stator core, and the liquid return groove is used to receive coolant flowing out from the liquid outlet channel and serve as a channel for delivering the coolant to a heat exchanger; and the first distribution groove is in communication with one end of the liquid inlet channel, and the liquid inlet channel is spaced from the liquid return groove. By providing the liquid return groove, the coolant can be delivered to the heat exchanger for cooling. A temperature of the cooled coolant decreases and the coolant may be reused for heat dissipation. In addition, the liquid inlet channel and the first distribution groove in communication with the liquid inlet channel are both spaced from the liquid return groove, so that it can be avoided that heat dissipation is affected by higher-temperature coolant contained in the liquid return groove being mixed with lower-temperature coolant in the liquid inlet channel and the distribution groove in communication with the liquid inlet channel.

In a ninth implementation, the motor housing is provided with two adjacent liquid inlet channels spaced apart, opposite ends of the first distribution groove in an extension direction are spaced apart, and each end is in communication with one liquid inlet channel, so that the coolant enters the first distribution groove from the two liquid inlet channels, and flows into the stator groove while flowing along opposite directions in the first distribution groove. When the two paths of coolant in the first distribution groove and the second distribution groove flow into the stator groove in communication with the liquid outlet channel, the coolant may flow out from the stator core through the liquid outlet groove. In this implementation, the first distribution groove and the second distribution groove both serve as parallel channels, and the coolant flows along opposite directions in the parallel channels, so that the coolant can be distributed to the stator grooves more rapidly, to implement rapid heat dissipation of the stator core.

In a tenth implementation, in an axial direction of the stator core, opposite ends of the stator core are both recessed within the motor housing, and one end of the liquid outlet channel extends beyond the stator core; the inner wall of the motor housing is provided with a liquid return groove, opposite ends of the liquid return groove in an extension direction both extend beyond the stator core, and the liquid return groove is used to receive coolant flowing out from the liquid outlet channel and serves as a channel for delivering the coolant to a heat exchanger; and the liquid return groove passes between the two liquid inlet channels and between the opposite ends, and is spaced from both the two liquid inlet channels and the opposite ends.

In this tenth implementation, the coolant flowing out from the liquid outlet channel may fall freely into the liquid return groove. In other words, when the liquid outlet groove and the liquid return groove are respectively located at opposite ends of the stator core in a radial direction, and the motor is located at a mounting position, the liquid outlet groove is located at the top of the motor, and the liquid return groove is located at the bottom of the motor. Alternatively, the liquid outlet channel may be in communication with the liquid return groove through a pipeline, and the coolant flowing out from the liquid outlet channel may flow into the liquid return groove through the pipeline. In this case, relative positions of the liquid outlet channel and the liquid return groove are not limited as described above.

In addition, the two liquid inlet channels, the opposite ends of the first distribution groove, and the opposite ends of the second distribution groove are all spaced from the liquid return groove, so that it can be avoided that heat dissipation is affected by higher-temperature coolant contained in the liquid return groove being mixed with lower-temperature coolant in the liquid inlet channel, the first distribution groove, and the second distribution groove.

In this embodiment of this application, the extension direction of the distribution groove is the circumferential direction of the stator core, and the extension direction of the stator groove is the axial direction of the stator core.

In this embodiment of this application, the stator core includes several iron cores sequentially laminated, a periphery of each iron core is provided with a notch, a portion that is on the iron cores at two ends in the axial direction of the stator core and on which the notch is not provided is aligned with the notch of the iron core adjacent to the iron cores at the two ends of the axial direction, and all the notches on the remaining iron cores between the iron cores at the two ends of the axial direction are sequentially in communication to form the stator groove. According to the solution of this implementation, only a notch needs to be provided on an edge of a single iron core, and several such iron cores are sequentially laminated during assembly, so that the notches at corresponding positions of the iron cores are sequentially in communication, and the stator core can be obtained by rotating the iron core located at the outermost side by a specific angle, and aligning a position that is on the iron core and on which the notch is not provided with the notch of the adjacent iron core. Since all iron cores constituting the stator core have a same structure and may be manufactured by using a same process, design and manufacturing costs are greatly reduced.

According to a second aspect, an embodiment of this application provides a motor cooling system, including a heat exchanger, a delivery device, and the motor according to the first aspect. The heat exchanger is configured to receive and cool coolant flowing out from a liquid outlet channel; and the delivery device is in communication with the heat exchanger and a liquid inlet channel, and is configured to deliver the cooled coolant from the liquid inlet channel to the distribution groove, and drive the coolant to flow in channels. The motor cooling system of this embodiment not only can effectively dissipate heat for a stator of the motor, but also can implement cyclic utilization of the coolant.

In an implementation, a filter is disposed between the heat exchanger and the delivery device, so that lower-temperature coolant flowing into the delivery device can be filtered to prevent impurities from entering the delivery device. The filter may be an electric device having a filtering function, or may simply be a mechanical component (for example, a filter screen or a filter element). Certainly, a filter may alternatively be disposed between the motor and the heat exchanger, to filter higher-temperature coolant entering the heat exchanger; and/or a filter may alternatively be disposed between the delivery device and the motor to filter lower-temperature coolant entering the distribution groove.

According to a third aspect, an embodiment of this application provides an electric vehicle, including a motor controller, a gearbox, and the motor cooling system according to the second aspect. The motor controller is connected to the motor to control the motor to operate. The gearbox is connected to a motor shaft of the motor, and is configured to transmit a torque output by the motor to another mechanical device. The electric vehicle includes but is not limited to a vehicle such as an electric car, an electric bus, and an electric motorcycle. In the electric vehicle of this embodiment, a stator of the motor can achieve effective and continuous heat dissipation, and has high operation reliability. Therefore, vehicle performance is ensured.

DESCRIPTION OF EMBODIMENTS

Embodiments of this application provide a motor and a motor cooling system including the motor. The motor cooling system may be applied to a mechanical equipment. The mechanical equipment includes but is not limited to an electric vehicle, for example, may be any mechanical device such as machining equipment or an engineering machinery. The motor cooling system may use coolant as a heat exchange medium, and a channel is provided in the motor cooling system. When flowing in the channel, the coolant takes away heat generated by the motor, to implement heat dissipation and cooling of the motor. The motor cooling system may include a heat exchanger and a delivery device. The heat exchanger is configured to perform heat exchange on the coolant carrying heat of the motor to cool the coolant, so that the coolant can be reused. The delivery device is configured to provide power for the coolant to drive the coolant to flow in the channel. The following describes in detail the solutions in the embodiments of this application with reference to the accompanying drawings.

Figure 1:
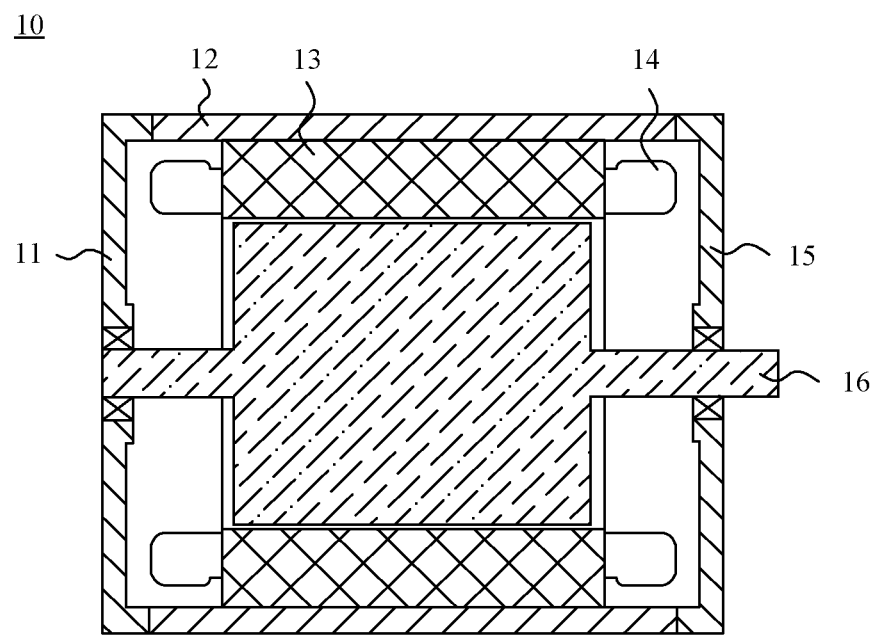
FIG. 1 is a schematic cross-sectional structural view of a motor according to an embodiment of this application, where a cutting plane of the cross-sectional view passes through an axis of a stator core.
Figure 2:
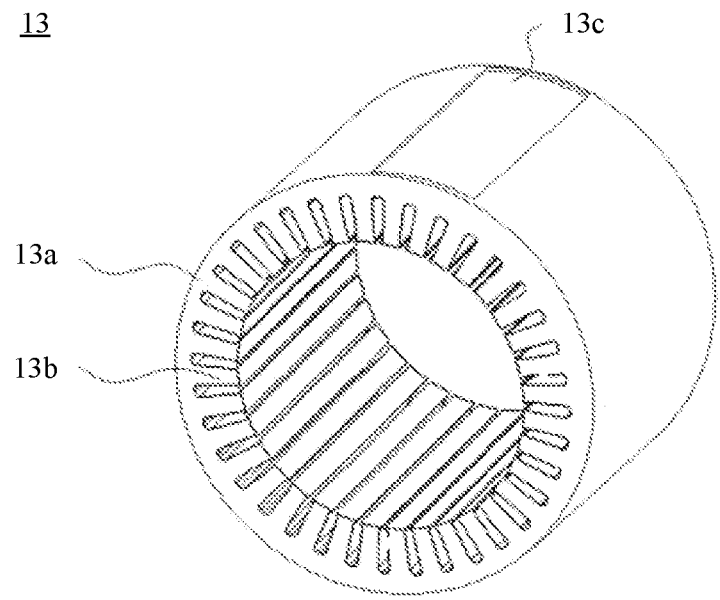
FIG. 2 is a schematic three-dimensional structural view of a stator core of the motor shown in FIG. 1.

As shown in FIG. 1 and FIG. 2, the motor 10 of this embodiment may include a motor housing 12, a first end cap 11, a second end cap 15, a stator core 13, a stator winding 14, and a rotor 16. The motor housing 12, the first end cap 11, the second end cap 15, the stator core 13, and the stator winding 14 all belong to a stator part of the motor 10. The stator core 13 is of a cylinder shape, and an axial direction (namely, a direction in which a central axis of the stator core 13 is located) and a circumferential direction (namely, a circumferential direction around the central axis of the stator core 13 and perpendicular to the axial direction) of the stator core 13 may be defined. The motor housing 12 is sleeved outside the stator core 13 and wraps the stator core 13 along the circumferential direction. In the axial direction, a length of the stator core 13 may be less than a length of the motor housing 12, and opposite ends of the stator core 13 are recessed within the motor housing 12. The first end cap 11 and the second end cap 15 are respectively mounted at opposite ends of the motor housing 12 along the axial direction, and form a closed cavity with the motor housing 12. The stator core 13, the stator winding 14, and the rotor 16 are all mounted in the closed cavity. The opposite ends of the rotor 16 may be mounted on the first end cap 11 and the second end cap 15 by using bearings. The stator core 13 is sleeved on an outer periphery of the rotor 16, and an air gap is left between the stator core 13 and the rotor 16 in a radial direction. The stator core 13 may include a tooth portion 13b and a yoke portion 13a. The tooth portion 13b is formed by a plurality of teeth arranged at intervals along a circumferential direction and the yoke portion 13a is wrapped around an outer periphery of the tooth portion 13b. In other words, the tooth portion 13b is formed on an inner side of the stator core 13, and is formed by providing a plurality of grooves on an inner wall of the stator core 13 toward the central axis of the stator core 13. The yoke portion 13a is formed on an outer side of the stator core 13. The stator core 13 may be formed by sequentially laminating several iron cores (including but not limited to silicon steel sheets) along an axial direction of the stator core 13. The stator winding 14 may be wound in a groove between adjacent teeth in the tooth portion 13b. Opposite ends of the stator winding 14 along the axial direction may both extend beyond the stator core 13, but are recessed within the motor housing 12.

Figure 3:
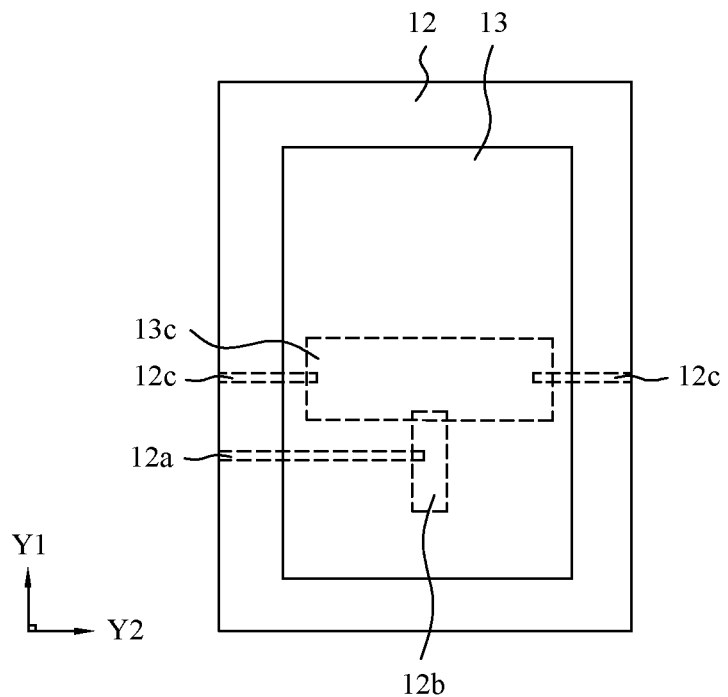
FIG. 3 is a schematic view of circumferential expansion of a motor housing and a stator core of the motor shown in FIG. 1.

With reference to FIG. 1 and FIG. 3, the motor housing 12 is provided with a distribution groove 12b, a liquid inlet channel 12a, and a liquid outlet channel 12c, and the distribution groove 12b, the liquid inlet channel 12a, and the liquid outlet channel 12c all serve as some coolant channels.

The distribution groove 12b is provided on an inner wall of the motor housing 12, and is used to contain coolant flowing into the motor housing 12 through the liquid inlet channel 12a, and distribute the coolant to an outer wall of the stator core 13 (to be described in detail below). The inner wall is an inner surface that is of the motor housing 12 and that faces the stator core 13, a width of the distribution groove 12b on the inner surface (the distribution groove 12b is similar to a gap and has a width similar to a width of the gap) is less than a length (similar to a length of the gap) of the distribution groove 12b, and a direction in which a connection line of opposite ends at a length dimension is located may be referred to as an extension direction. In this embodiment, an extension direction of the distribution groove 12b may be designed as required, for example, may be a circumferential direction Y1 shown in FIG. 3. Certainly, the extension direction may alternatively be not parallel to the circumferential direction Y1, for example, may be at an acute angle to the circumferential direction Y1. In addition, the distribution groove 12b may be a straight groove shown in FIG. 3. To be specific, when the inner wall of the motor housing 12 is expanded along the circumferential direction Y1, the distribution groove 12b extends along a straight line (that is, the distribution groove 12b has only one extension direction). Alternatively, the distribution groove 12b may be a non-straight groove. To be specific, when the inner wall of the motor housing 12 is expanded along the circumferential direction Y1, the distribution groove 12b extends along a non-straight direction (for example, a curve or a polyline formed by at least two straight lines) (that is, positions of the distribution groove 12b have different extension directions). The position of the distribution groove 12b may be designed as required. For example, as shown in FIG. 3, a center of the distribution groove 12b may be located in a middle portion of the inner wall of the motor housing 12 in the axial direction Y2. In the circumferential direction Y1, a central position of the distribution groove 12b may be set as required. There is at least one distribution groove 12b. Certainly, to deliver more coolant to improve a heat dissipation effect, there may be two or more distribution grooves 12b. When there is more than one distribution groove 12b, extension directions of the distribution grooves 12b may be the same or completely different, and the distribution grooves 12b may basically cover the inner wall of the motor housing 12.

The liquid inlet channel 12a is in communication with the distribution groove 12b and an outer space of the motor housing 12, and is used to allow coolant outside the motor housing 12 to flow into the distribution groove 12b. As shown in FIG. 3, in an implementation, the liquid inlet channel 12a may pass between the inner and outer walls of the motor housing 12, and opposite ends of the liquid inlet channel 12a may each form an opening on a groove wall (a bottom wall and/or a side wall) of the distribution groove 12b and an axial end face of the motor housing 12 (referring to a surface that may be fitted with the first end cap 11 or the second end cap 15 and whose normal direction is the axial direction of the stator core 13). In this case, the liquid inlet channel 12a may be bent (for example, when one end of the liquid inlet channel 12a forms an opening on the bottom wall of the distribution groove 12b) or straight (for example, when one end of the liquid inlet channel 12a forms an opening on the side wall of the distribution groove 12b). Alternatively, in another implementation, one end of the liquid inlet channel 12a may form an opening on a groove wall (a bottom wall and/or a side wall) of the distribution groove 12b, and the opposite other end may penetrate the motor housing 12 along a thickness direction. In this case, the liquid inlet channel 12a may be bent (for example, when one end of the liquid inlet channel 12a forms an opening on the side wall of the distribution groove 12b) or straight (for example, when one end of the liquid inlet channel 12a forms an opening on the bottom wall of the distribution groove 12b). The position of the liquid inlet channel 12a may be designed as required. Based on an outer space in communication with the distribution groove 12b and the motor housing 12, the position of the liquid inlet channel 12a may be further determined with reference to a design requirement for facilitating flow-in of the coolant. There is at least one liquid inlet channels 12a (for example, FIG. 3 shows one liquid inlet channel 12a). Certainly, to input the coolant more rapidly to improve heat dissipation efficiency, there may be two or more liquid inlet channels 12a, and one distribution groove 12b may correspond to one liquid inlet channel 12a. The shape and opening position of each liquid inlet channel 12a may be flexibly set as required.

The liquid outlet channel 12c is in communication with an inner cavity and the outer space of the motor housing 12, and the coolant flowing on the outer wall of the stator core 13 (matching with the inner wall of the motor housing 12) may flow out from the stator core 13 through the liquid outlet channel 12c. As shown in FIG. 3, in an implementation, opposite ends of the liquid outlet channel 12c each form an opening on the inner wall and the axial end surface of the motor housing 12. In this case, the liquid outlet channel 12c may be bent. Alternatively, in another implementation, the liquid outlet channel 12c may penetrate the motor housing 12 along a thickness direction of the motor housing 12, to form an opening on the inner wall and form an opening on the outer wall of the motor housing 12. In this case, the liquid outlet channel 12c may be straight. The position of the liquid outlet channel 12c may be designed as required. Based on inner and outer spaces in communication with the motor housing 12, the position of the liquid outlet channel 12c may be further determined with reference to a design requirement for facilitating flow-in of the coolant. There is at least one liquid outlet channel 12c. Certainly, to allow the coolant to flow out from different positions of the stator core 13 to improve heat dissipation efficiency, there may be two or more liquid outlet channels 12c (for example, FIG. 3 shows two liquid outlet channels 12c located at the opposite ends of the motor housing 12 in the axial direction Y2). The shape and opening position of each liquid outlet channel 12c may be flexibly set as required.

As shown in FIG. 2, the outer wall of the stator core 13 is provided with a stator groove 13c, and the stator groove 13c may receive coolant from the distribution groove 12b and serve as a channel for the coolant on the stator core 13 (to be described in detail below). The outer wall is an outer surface that is of the stator core 13 and that faces the inner wall of the motor housing 12, namely, an outer surface of the yoke portion 13a. In this embodiment, an extension direction of the stator groove 13c (the meaning of the extension direction is the same as that described above) intersects an extension direction of the distribution groove 12b. In other words, extension directions of the stator groove 13c and the distribution groove 12b are not parallel, but intersect to form an angle. For example, as shown in FIG. 3, in an implementation, the extension direction of the stator groove 13c may be an axial direction Y2, the extension direction of the distribution groove 12b may be a circumferential direction Y1, and the axial direction Y2 is perpendicular to the circumferential direction Y1. In other implementations, the extension direction of the stator groove 13c may be another direction intersecting the distribution groove 12b, such as a direction at an acute angle to the axial direction Y2. Similar to the distribution groove 12b, the stator groove 13c may be a straight groove shown in FIG. 2 and FIG. 3, or may be a non-straight groove. The position of the stator groove 13c may be designed as required, as long as the distribution groove 12b is in communication with the liquid outlet channel 12c. There is at least one stator groove 13c. Certainly, to enable more coolant to come into contact with the stator core 13 to improve a heat dissipation effect, there may be two or more stator grooves 13c. When there is more than one stator groove 13c, extension directions of the stator grooves 13c may be the same or completely different. An extension direction of at least a part of the stator groove 13c is a first direction, and an extension direction of at least a part of the distribution grooves 12b is a second direction. The first direction intersects the second direction. One stator groove 13c may be in communication with several liquid outlet channels 12c (for example, FIG. 3 shows one stator groove 13c in communication with two liquid outlet channels 12c) or several stator grooves 13c are in one-to-one communication with several distribution channels and several liquid outlet channels 12c.

Figure 4:
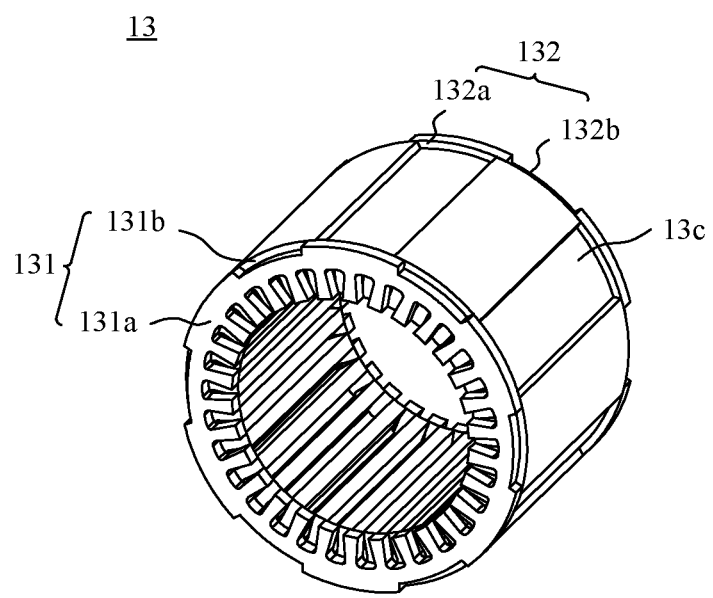
FIG. 4 is another schematic three-dimensional structural view of a stator core of the motor shown in FIG. 1.

In this embodiment, opposite ends of the stator groove 13c in the extension direction are both closed, namely, neither of the opposite ends of the stator groove 13c penetrates the axial end face of the stator core 13. Specifically, as shown in FIG. 4, in an implementation, a periphery of each iron core constituting the stator core 13 is provided with a notch. In an iron core 131 and an iron core 132 (at least one iron core at each end) at two ends of the stator core 13 in the axial direction, a portion 131a that is on the iron core 131 and on which the notch 131b is not provided is aligned with the notch of the iron core adjacent to the iron core 131. Similarly, a portion 132a that is on the iron core 132 and on which the notch 132b is not provided is aligned with the notch of the iron core adjacent to the iron core 132. (In other words, a portion that is on the iron core at each end and on which the notch is not provided is aligned with the notch of the iron core adjacent to the iron core), and all the notches on the remaining iron cores between the iron core 131 and the iron core 132 are sequentially in communication to form one stator groove 13c closed at two ends (the iron cores between two ends in the axial direction are not subdivided in FIG. 4 for the sake of simplicity of the drawing). In this implementation, several notches may be spaced apart on the periphery of each iron core, and the several notches at corresponding positions on the iron cores between two ends in the axial direction are sequentially in communication to form several stator grooves 13c. In addition, the several notches at corresponding positions on the iron cores between the two ends in the axial direction are sequentially aligned, so that the formed stator grooves 13c extend along the axial direction. Certainly, the several notches at corresponding positions on the iron cores between the two ends in the axial direction may alternatively be sequentially misplaced along the circumferential direction, so that the formed stator grooves 13c extend along a direction at an acute angle with the axial direction. According to the solution of this implementation, only a notch needs to be provided on an edge of a single iron core, and several such iron cores are sequentially laminated during assembly, so that the notches at corresponding positions of the iron cores are sequentially in communication, and the stator core 13 can be obtained by rotating the iron core located at the outermost side by a specific angle, and aligning a position that is on the iron core and on which the notch is not provided with the notch of the adjacent iron core. Since all iron cores constituting the stator core 13 have a same structure and may be manufactured by using a same process, design and manufacturing costs are greatly reduced. Certainly, the stator core 13 may also be manufactured in other manners. For example, two types of iron cores, namely, an iron core provided with no notch on the periphery and an iron core provided with a notch on the periphery, may be separately designed and machined, and the iron core provided with no notch is assembled on the outermost side, and the iron core provided with a notch is assembled in the middle.

In this embodiment, the liquid inlet channel 12a, the distribution groove 12b, the stator groove 13c, and the liquid outlet channel 12c are in communication with each other to form a coolant channel. As shown in FIG. 3, in an implementation, the coolant may enter an inner cavity of the motor housing 12 through the liquid inlet channel 12a, sequentially flow into the distribution groove 12b, the stator groove 13c, and the liquid outlet channel 12c, and finally flow out from the stator core 13 through the liquid outlet channel 12c. When the coolant enters the stator groove 13c from the distribution groove 12b, since the distribution groove 12b may be located in a middle portion of the stator groove 13c along the axial direction, the coolant may flow from the middle portion of the stator groove 13c to two ends of the stator groove 13c, and flows out from the two liquid outlet channels 12c at the two ends of the stator groove 13c. In other implementations, the flow order of the coolant in the distribution groove 12b and the stator groove 13c may be based on the distribution of the distribution groove 12b and the stator groove 13c, and is not limited to flowing into the stator groove 13c sequentially from the distribution groove 12b (which will be described in the following implementations). When the coolant flows in the stator groove 13c, the stator core 13 may be cooled by heat exchange. With reference to FIG. 1 and FIG. 3, after the coolant flows out from the stator core 13 through the liquid outlet channel 12c, the coolant may be sprayed to an end portion of the stator winding 14 (when the liquid outlet channel 12c is located at the top in the view of FIG. 1) to further dissipate heat for the stator winding 14.

According to the solutions of this embodiment, the distribution groove 12b, the liquid inlet channel 12a, and the liquid outlet channel 12c are provided on the motor housing 12, and the outer wall of the stator core 13 is provided with the stator groove 13c, so that the liquid inlet channel 12a, the distribution groove 12b, the stator groove 13c, and the liquid outlet channel 12c are in communication with each other to form the coolant channel. Since the outer wall of the stator core 13 is provided with the stator groove 13c, a contact area between coolant and the stator core 13 is increased, so that the coolant can fully come into contact with the stator core 13, thereby reducing a contact thermal resistance between the coolant and the stator core 13, and improving heat dissipation efficiency of the stator core 13. The opposite ends of the stator groove 13c in the extension direction are both closed, so that the coolant can only flow out through the liquid outlet channel 12c instead of flowing out from the opposite ends of the stator groove 13c, it is ensured that a region that is on the stator core 13 and on which heat needs to be dissipated is well dissipated, a defect that heat of the stator core 13 cannot be evenly dissipated due to a rapid loss of the coolant through the opposite ends of the stator groove 13c (especially when there are a plurality of stator grooves 13c, if opposite ends of each stator groove 13c are open, the coolant is continuously lost when flowing through the previous stator grooves 13c, and the coolant may not be distributed to the subsequent stator grooves 13c, causing a heat dissipation failure on a region that is on the stator core 13 and on which the stator grooves 13c are located) is avoided, and it can be avoided that a power output of the motor 10 is affected by the rotor 16 losing kinetic energy due to a large amount of coolant flowing out from the opposite ends of the stator groove 13c and coming into contact with the rotor 16. In addition, the coolant channel is constructed in a grid form by intersecting the extension directions of the distribution groove 12b and the stator groove 13c, which is a channel structure design that takes into full consideration a manufacturing process of the product, and meets a manufacturing requirement of the motor 10. Particularly, the distribution groove 12b is designed to extend along the circumferential direction, and the distribution groove 12b in the circumferential direction can be easily machined on the inner wall of the motor housing 12 by a process such as casting. The stator groove 13c is designed to extend along the axial direction, only a notch needs to be provided on an edge of a single iron core, several such iron cores are sequentially laminated during assembly, and the notches are aligned to obtain the stator groove 13c, so that the several iron cores have a same design structure and can adopt a same machining process, thereby greatly simplifying design and manufacturing costs. In addition, the channels are dispersed in the stator core 13 and the motor housing 12 instead of all concentrated in the motor housing 12, so that a defect that a thickness of the motor housing 12 is greatly increased due to a large quantity of channels provided on the motor housing 12 can be avoided (to ensure strength of the motor housing 12 while providing the channels, the thickness of the motor housing 12 needs to be increased accordingly), and the motor housing 12 can be made as thin as possible and costs are reduced.

The following fully and in detail describes the solutions of this embodiment in several specific implementations.

Figure 5:
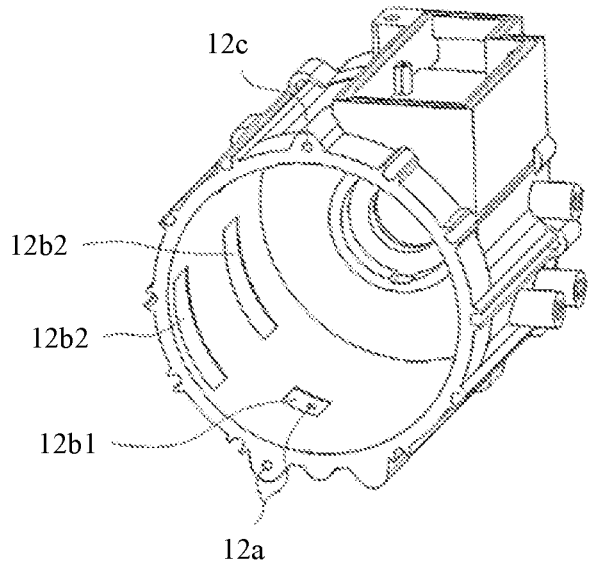
FIG. 5 is a schematic three-dimensional structural view of a motor housing in a first implementation according to an embodiment of this application.
Figure 6:
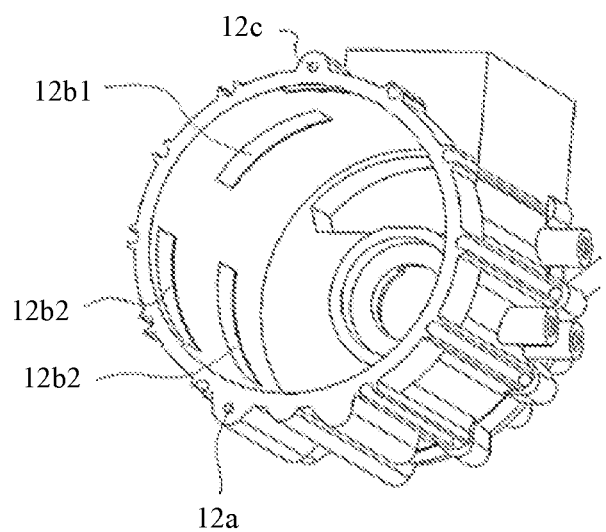
FIG. 6 is another schematic three-dimensional structural view of a motor housing in a first implementation according to an embodiment of this application.

As shown in FIG. 5 and FIG. 6, specifically, in a first implementation, the distribution groove may include two first distribution grooves 12b1 and two second distribution grooves 12b2. In the axial direction of the stator core 13, the two first distribution grooves 12b1 are located between the two second distribution grooves 12b2, and the two second distribution grooves 12b2 are spaced apart and close to two axial end faces of the motor housing 12 respectively. Each first distribution groove 12b1 is spaced from the two second distribution grooves 12b2 in the circumferential direction of the stator core 13. The liquid inlet channel 12a is in communication with the first distribution groove 12b1 and the outer space of the motor housing 12. With reference to FIG. 6, three stator grooves 13c are spaced apart along the circumferential direction, the first distribution groove 12b1 in communication with the liquid inlet channel 12a is in communication with the two second distribution grooves 12b2 through the first stator groove 13c, the two second distribution grooves 12b2 are in communication with the other first distribution groove 12b1 through the second stator groove 13c, opposite ends of the other first distribution groove 12b1 are in communication with the second stator groove 13c and the third stator groove 13c respectively, the third stator groove 13c is in communication with the two liquid outlet channels 12c, and the two liquid outlet channels 12c are located at opposite ends of the third stator groove 13c respectively.

In this first implementation, extension directions of two stator grooves 13c may be both axial extension directions, and the two first distribution grooves 12b1 and the two second distribution grooves 12b2 may both extend along the circumferential direction. In other implementations, on the premise that the extension direction of at least a part of the stator groove 13c intersects the extension direction of at least a part of the distribution groove (that is, at least one stator groove 13c intersects an extension direction of one distribution groove), and extension directions of the stator grooves 13c and the distribution grooves may be designed as required. For example, the two second distribution grooves 12b2 may have different extension directions, and one stator groove 13c may intersect only an extension direction of one second distribution groove 12b2, or intersect both extension directions of the two second distribution grooves 12b2. FIG. 4 to FIG. 6 of this first implementation show only two first distribution grooves 12b1, two second distribution grooves 12b2, and three stator grooves 13c, and it should be understood that this is a simplified representation. Actually, the quantities of the first distribution grooves 12b1, the second distribution grooves 12b2, and the stator grooves 13c may be set as required. For example, there may be at least one first distribution groove 12b1, there may be at least 2*N (N=1, 2, 3, . . . ) second distribution grooves 12b2, and there may be at least two stator grooves 13c (when there are two stator grooves 13c, there is one first distribution groove 12b1 and two second distribution grooves 12b2).

Figure 7:
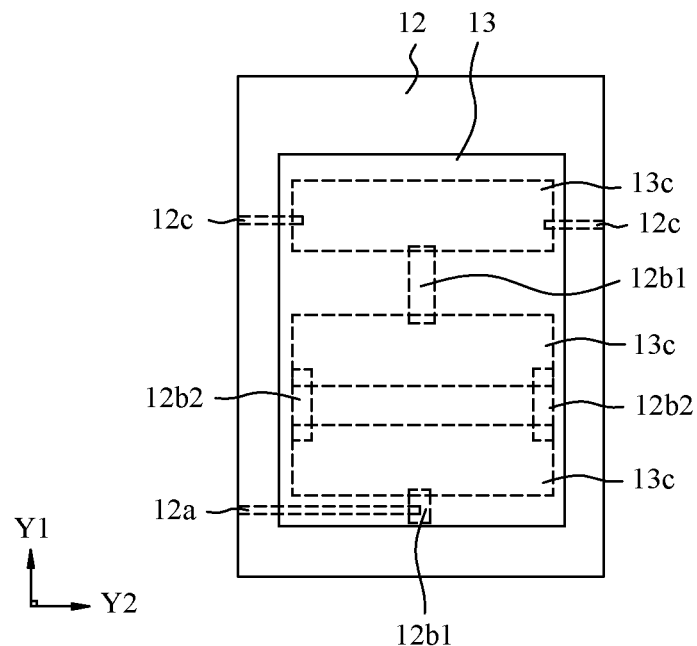
FIG. 7 is a schematic view of circumferential expansion of a motor housing and a stator core in a first implementation according to an embodiment of this application.

As shown in FIG. 7, in this first implementation, the liquid inlet channel 12a, one first distribution groove 12b1, the first stator groove 13c, the two second distribution grooves 12b2, the second stator groove 13c, the other first distribution groove 12b1, the third stator groove 13c, and the two liquid outlet channels 12c are sequentially in communication to form a channel. The coolant flows into an inner cavity of the motor housing 12 from the liquid inlet channel 12a, and sequentially flows into one first distribution groove 12b1, the first stator groove 13c, the two second distribution grooves 12b2, the second stator groove 13c, the other first distribution groove 12b1, and the third stator groove 13c, and finally flows out from the stator core 13 through the two liquid outlet channels 12c. When there are other quantities of the first distribution grooves 12b1, the second distribution grooves 12b2, and the stator grooves 13c, the coolant circulates based on the flow order of the first distribution groove 12b1-the stator groove 13c-the second distribution groove 12b2-the stator groove 13c-the first distribution groove 12b1. From the overall flow trend, the coolant flows unidirectionally (for example, clockwise or counterclockwise) on the inner wall of the motor housing 12. When the coolant flows in the stator groove 13c, the stator core 13 may be cooled by heat exchange. With reference to FIG. 1 and FIG. 7, after flowing out from the stator core 13 through the two liquid outlet channels 12c, the coolant may be sprayed to opposite ends of a stator winding 14 (when the liquid outlet channel 12c is located at the top in the view of FIG. 1) to further dissipate heat for the stator winding 14. Since the first distribution groove 12b1 is located between the two ends of the stator groove 13c, when the coolant enters the stator groove 13c from the first distribution groove 12b1, the coolant may flow from a middle portion of the stator groove 13c to the two ends of the stator groove 13c. Since the two second distribution grooves 12b2 are located at the opposite ends of the stator groove 13c, when the coolant enters the stator groove 13c from the two second distribution grooves 12b2, the coolant may flow from the two ends of the stator groove 13c to the middle portion of the stator groove 13c. The channel design can ensure that the coolant is smoothly linked between the inner wall of the motor housing 12 and the outer wall of the stator core 13, and ensure that the coolant can completely cover the outer wall of the stator core 13, thereby ensuring the heat dissipation efficiency. In addition, one liquid inlet channel 12a is designed so that the coolant flows in from one inlet in a centralized manner, thereby simplifying the design of the liquid inlet channel 12a of the motor housing 12, and facilitating accurate control on a flow direction of the coolant, to achieve an expected heat dissipation effect. In other implementations, there may be other quantities of the liquid inlet channels 12a and the liquid outlet channels 12c. For example, there are at least two liquid inlet channels 12a, and there are one or at least three liquid outlet channels 12c.

Figure 8:
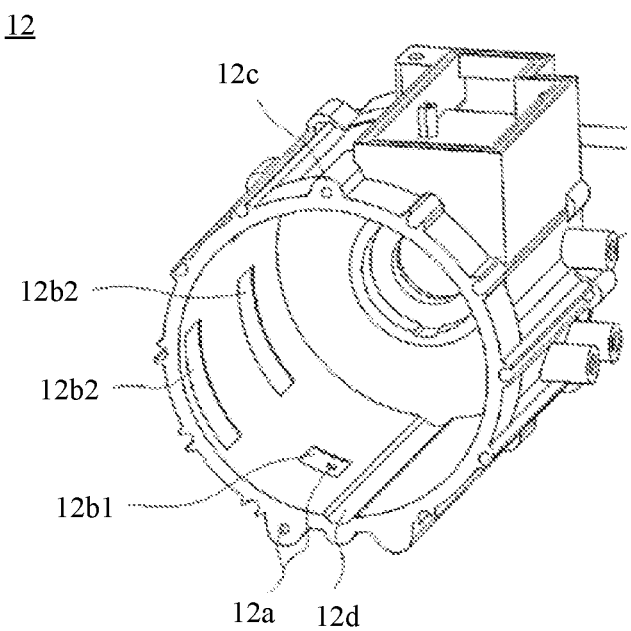
FIG. 8 is a schematic three-dimensional structural view of a motor housing in a second implementation according to an embodiment of this application.
Figure 9:
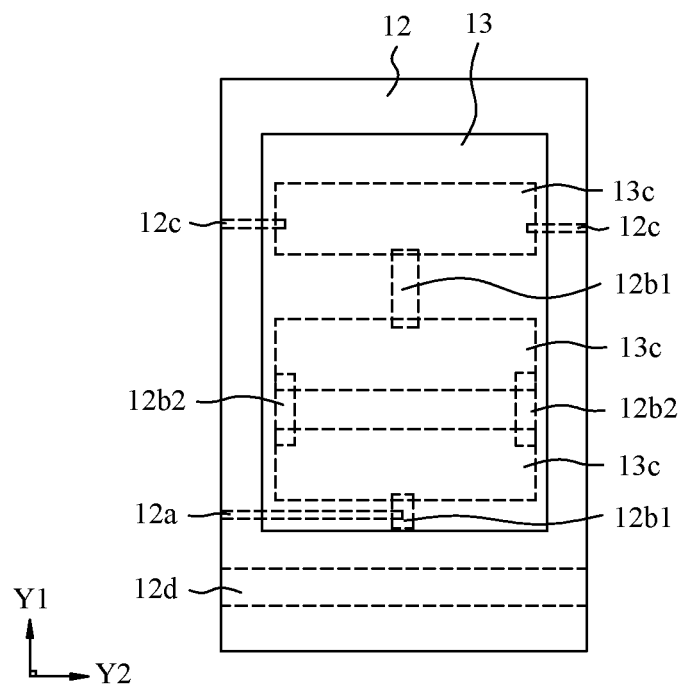
FIG. 9 is a schematic view of circumferential expansion of a motor housing and a stator core in a second implementation according to an embodiment of this application.

As shown in FIG. 8 and FIG. 9, in a second implementation, based on the first implementation, the inner wall of the motor housing 12 may be further provided with a liquid return groove 12d, and opposite ends of the liquid return groove 12d in an extension direction extend beyond the stator core 13. In this implementation, the opposite ends of the liquid return groove 12d may both penetrate an axial end face of the motor housing 12, or certainly at least one end may not penetrate an axial end face of the motor housing 12. The extension direction of the liquid return groove 12d is the axial direction of the stator core 13, or certainly may be another suitable direction, for example, a direction at an acute angle to the axial direction. The liquid return groove 12d may be a straight groove or a non-straight groove. The liquid return groove 12d may be in communication with a heat exchanger, and the liquid return groove 12d is used to receive coolant flowing out from the liquid outlet channel 12c, and deliver the coolant to the heat exchanger for cooling. A temperature of the cooled coolant decreases and the coolant may be reused for heat dissipation. In this implementation, the coolant flowing out from the liquid outlet channel 12c may fall freely into the liquid return groove 12d. In other words, when the liquid outlet groove and the liquid return groove 12d are respectively located at opposite ends of the stator core 13 in a radial direction, and the motor 10 is located at a mounting position, the liquid outlet groove is located at the top of the motor 10, and the liquid return groove 12d is located at the bottom of the motor 10. Alternatively, the liquid outlet channel 12c may be in communication with the liquid return groove 12d through a pipeline, and the coolant flowing out from the liquid outlet channel 12c may flow into the liquid return groove 12d through the pipeline. In this case, relative positions of the liquid outlet channel 12c and the liquid return groove 12d are not limited as described above. In this implementation, since the liquid return groove 12d contains higher-temperature coolant, but lower-temperature coolant flows in the liquid inlet channel 12a and the distribution groove in communication with the liquid inlet channel 12a, to avoid heat dissipation affected by encounter and mixing of the higher-temperature coolant and the lower-temperature coolant, the liquid inlet channel 12a and the first distribution groove 12b1 in communication with the liquid inlet channel 12a may both be spaced from the liquid return groove 12d.

Figure 10:
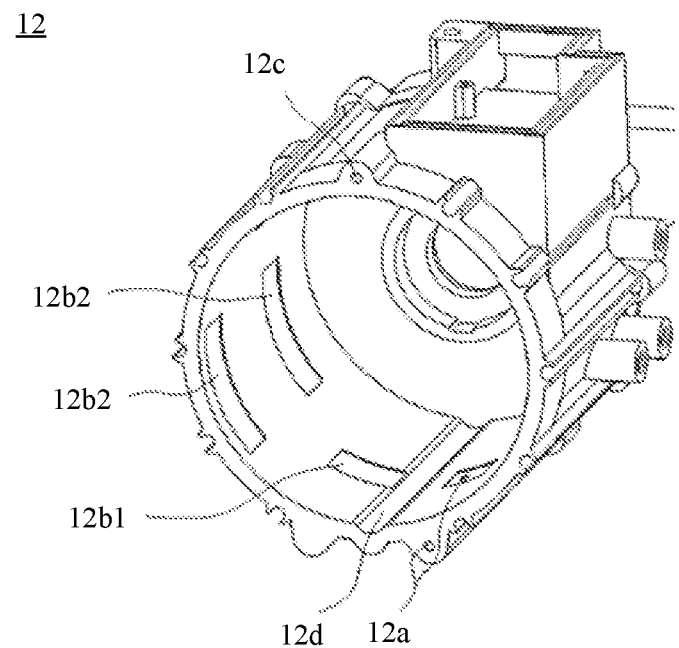
FIG. 10 is a schematic three-dimensional structural view of a motor housing in a third implementation according to an embodiment of this application.
Figure 11:
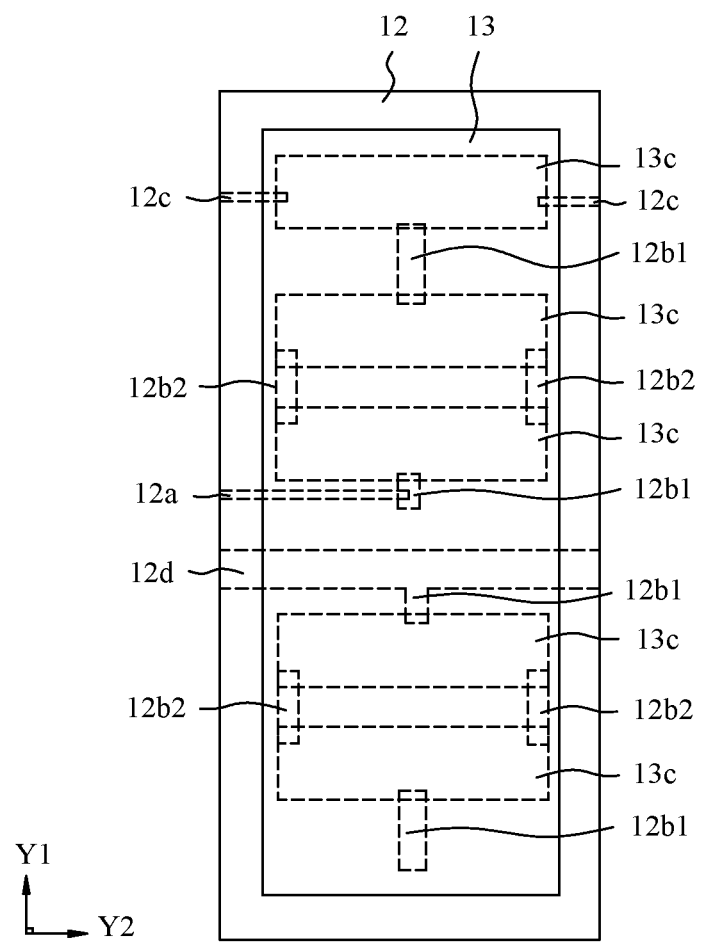
FIG. 11 is a schematic view of circumferential expansion of a motor housing and a stator core in a third implementation according to an embodiment of this application.

As shown in FIG. 10 and FIG. 11, in a third implementation, based on the second implementation, the inner wall of the motor housing 12 is provided with several first distribution grooves 12b1 and several second distribution grooves 12b2. The several first distribution grooves 12b1 are spaced apart along the circumferential direction of the stator core 13, and two second distribution grooves 12b2 are provided between every two first distribution grooves 12b1. The several first distribution grooves 12b1 include two first distribution grooves 12b1 that are adjacent to the liquid return groove 12d and that are respectively located on opposite sides of the liquid return grooves 12d in the extension direction. One first distribution groove 12b1 is in communication with the liquid inlet channel 12a and is spaced from the liquid return groove 12d, and the other first distribution grooves 12b1 is in communication with the liquid return groove 12d. The coolant enters the first distribution groove 12b1 in communication with the liquid inlet channel 12a from the liquid inlet channel 12a, and sequentially flows into the stator groove 13c, the two second distribution grooves 12b2, the stator groove 13c, the first distribution groove 12b1, the stator groove 13c, and the two second distribution grooves 12b2. This circulates until the coolant flows into the stator groove 13c in communication with the liquid outlet channel 12c. In this case, the coolant is divided into two paths, where one path flows out from the stator core 13 through the liquid outlet channel 12c, and enters the liquid return groove 12d, and the other path continues to flow into the subsequent first distribution groove 12b1 or the subsequent second distribution groove 12b2 from the stator groove 13c along the original flow direction and flow order until flowing into the first distribution groove 12b1 in communication with the liquid return groove 12d and merges into the liquid return groove 12d. In this implementation, since the first distribution groove 12b1 in communication with the liquid inlet channel 12a is spaced from the liquid return groove 12d, the lower-temperature coolant entering the motor housing 12 is not mixed with the higher-temperature coolant in the liquid return groove 12d, thereby ensuring the heat dissipation effect. In addition, the coolant on the inner wall of the motor housing 12 flows unidirectionally, thereby simplifying a channel design of the motor housing 12, facilitating accurate control on a flow direction of the coolant, and achieving an expected heat dissipation effect.

Figure 12:
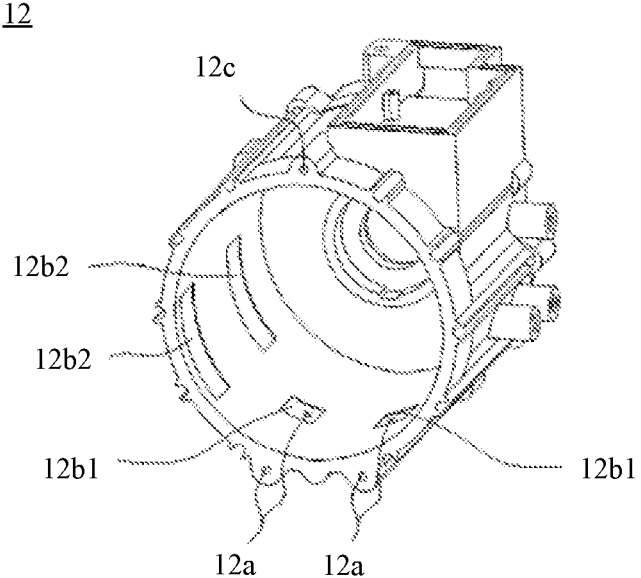
FIG. 12 is a schematic three-dimensional structural view of a motor housing in a fourth implementation according to an embodiment of this application.
Figure 13:
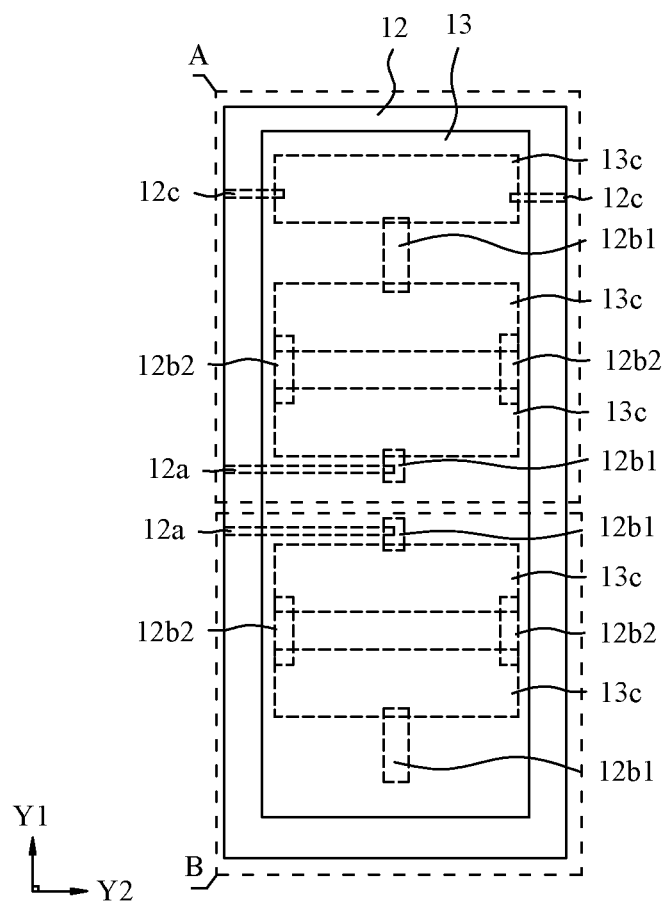
FIG. 13 is a schematic view of circumferential expansion of a motor housing and a stator core in a fourth implementation according to an embodiment of this application.

As shown in FIG. 12 and FIG. 13, in a fourth implementation, different from the first implementation, the coolant may flow in from two inlets of the motor housing 12, so that the coolant on the inner wall of the motor housing 12 has the overall flow trend of flowing bi-directionally. Specifically, the motor 10 may include a channel A and a channel B, also referred to herein as a first coolant channel and a second coolant channel, respectively, and each of the channel A and the channel B includes one liquid inlet channel 12a, one first distribution groove 12b1, the first stator groove 13c, two second distribution grooves 12b2, the second stator groove 13c, the other first distribution groove 12b1, the third stator groove 13c, and two liquid outlet channels 12c. The two liquid inlet channels 12a in the channel A and the channel B are spaced apart, and are also respectively spaced from the two first distribution grooves 12b1 in communication with the two liquid inlet channels 12a, and the channel A and the channel B share the third stator groove 13c and the two liquid outlet channels 12c (that is, the third stator groove 13c and the two liquid outlet channels 12c may be shared by the channel A and the channel B). FIG. 12 is a schematic diagram of circumferential expansion of the motor housing 12 and the stator core 13. The uppermost third stator groove 13c and the two liquid outlet channels 12c may be shared by the channel A and the channel B, and the lowermost first distribution groove is actually in communication with the uppermost third stator groove 13c. On the inner wall of the motor housing 12, the channel A and the channel B extend along opposite directions respectively from the first distribution groove 12b1 in communication with the liquid inlet channel 12a and finally merge. The coolant flows into the motor housing 12 from the two liquid inlet channels 12a. The two paths of coolant on the inner wall of the motor housing 12 flow along opposite directions (one path clockwise and the other path counterclockwise) respectively, finally merge into the third stator groove 13c, and flow out through the two liquid outlet channels 12c. For each of the channel A and the channel B, the coolant flows in the flow order described in the first implementation. To be specific, the coolant sequentially flows into the liquid inlet channel 12a, one first distribution groove 12b1, the first stator groove 13c, the two second distribution grooves 12b2, the second stator groove 13c, the other first distribution groove 12b1, and the third stator groove 13c, and finally flows out from the stator core 13 through the two liquid outlet channels 12c. This fourth implementation not only has the technical effect of the first implementation, but also makes, by designing two parallel channels on the motor housing 12 (the "channel" herein refers to the channel formed by the first distribution groove 12b1 and the second distribution groove 12b2), the coolant flow along opposite directions in the two parallel channels, so that the coolant can be distributed to the stator groove 13c more rapidly, to achieve rapid heat dissipation of the stator core 13.

Figure 14:
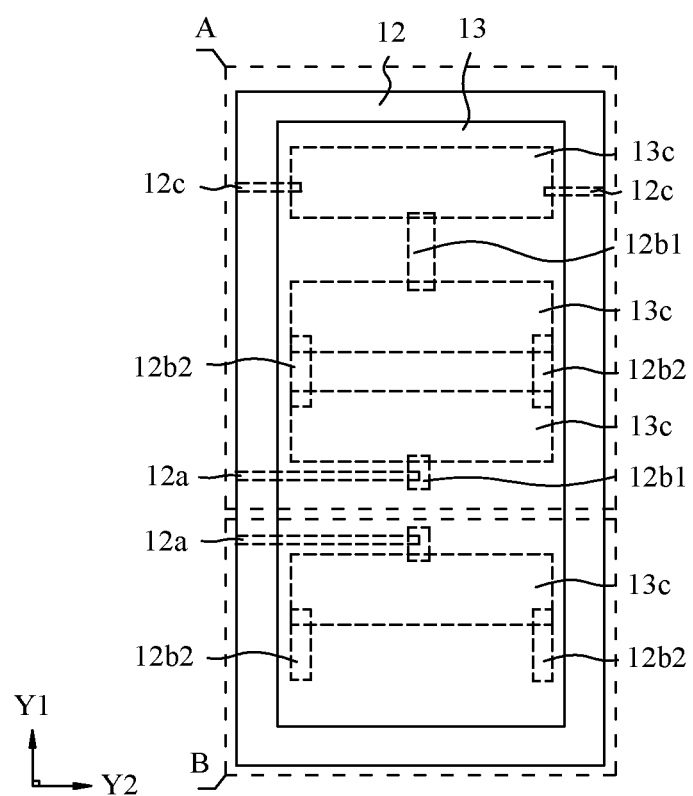
FIG. 14 is a schematic view of circumferential expansion of a motor housing and a stator core in a fifth implementation according to an embodiment of this application.

Alternatively, as shown in FIG. 14, in a fifth implementation, different from the fourth implementation, the channel A and the channel B of the motor 10 still merge, but the channel A and the channel B have different configurations. Specifically, the channel A may be the same as the channel A in the third implementation, but the channel B includes one liquid inlet channel 12a, one first distribution groove 12b1, one stator groove 13c, and two second distribution grooves 12b2, and the two second distribution grooves 12b2 are in communication with the third stator groove 13c in the previous channel (FIG. 13 is a schematic diagram of circumferential expansion of the motor housing 12 and the stator core 13, and the lowermost two second distribution grooves are actually in communication with the uppermost third stator groove 13c). In this implementation, a channel design solution of the motor 10 is developed, and heat dissipation requirements of motors 10 with different structures can be met.

Figure 15:
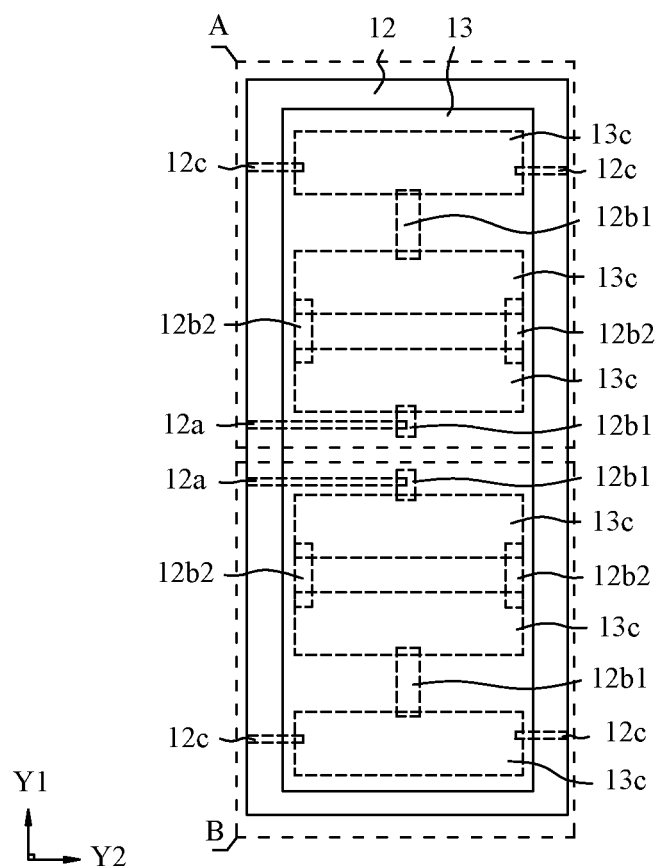
FIG. 15 and FIG. 16 are schematic views of circumferential expansion of a motor housing and a stator core in another implementation according to an embodiment of this application.
Figure 16:
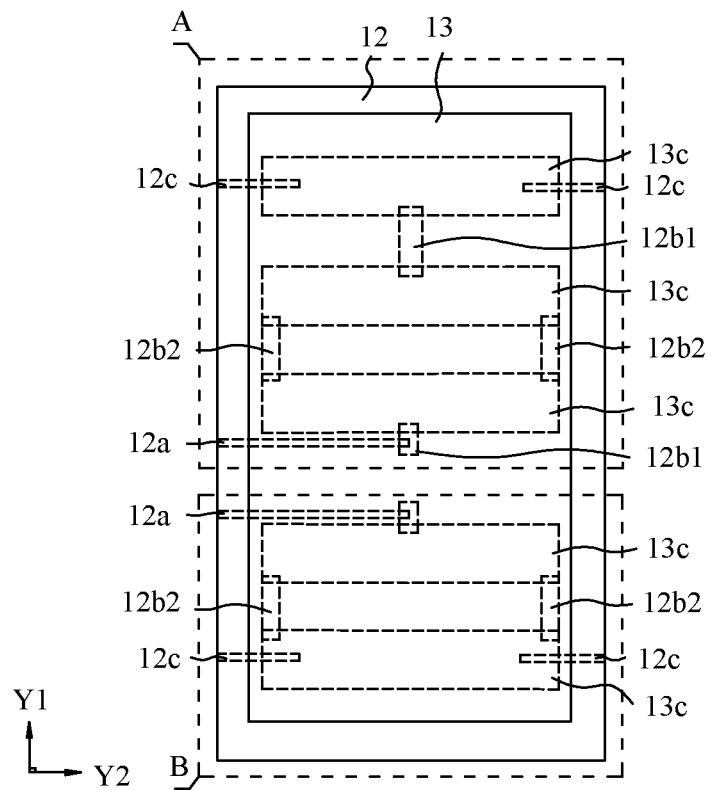

Alternatively, as shown in FIG. 15 and FIG. 16, in other implementations, different from the fourth embodiment, the channel A and the channel B of the motor 10 are independent of each other and do not merge. Specifically, the channel A and the channel B may each include the liquid inlet channel 12a, the first distribution groove 12b1, the stator groove 13c, the second distribution groove 12b2, and the liquid outlet channel 12c. The coolant in the channel A and the coolant in the channel B are isolated and do not merge. In the implementation shown in FIG. 14, the two channels have the same configuration, and the channel A and the channel B are symmetrical in structure. In the implementation shown in FIG. 15, the two channels have different configurations, and the channel A and the channel B are asymmetrical in structure. In this implementation, a channel design solution of the motor 10 is developed, and heat dissipation requirements of motors 10 with different structures can be met.

Figure 17:
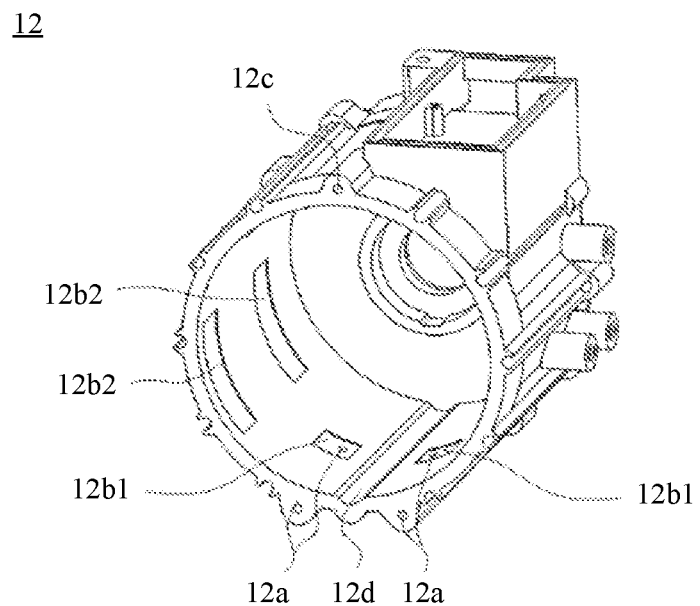
FIG. 17 is a schematic three-dimensional structural view of a motor housing in a sixth implementation according to an embodiment of this application.
Figure 18:
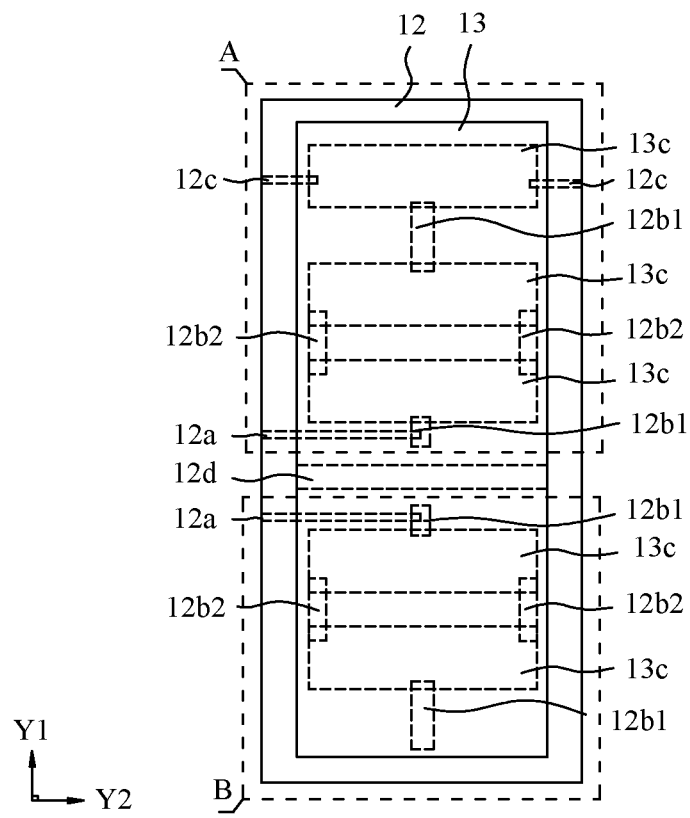
FIG. 18 is a schematic view of circumferential expansion of a motor housing and a stator core in a sixth implementation according to an embodiment of this application.

As shown in FIG. 17 and FIG. 18, in a sixth implementation, based on the fourth implementation, the inner wall of the motor housing 12 may be further provided with a liquid return groove 12d, and opposite ends of the liquid return groove 12d in an extension direction extend beyond the stator core 13. In this implementation, the opposite ends of the liquid return groove 12d may penetrate an axial end face of the motor housing 12, or certainly at least one end may not penetrate an axial end face of the motor housing 12. The extension direction of the liquid return groove 12d is the axial direction of the stator core 13, or certainly may be another suitable direction, for example, a direction at an acute angle to the axial direction. The liquid return groove 12d may be a straight groove or a non-straight groove. The liquid return groove 12d may be in communication with a heat exchanger, and the liquid return groove 12d is used to receive coolant flowing out from the liquid outlet channel 12c, and deliver the coolant to the heat exchanger for cooling. A temperature of the cooled coolant decreases and the coolant may be reused for heat dissipation. In this implementation, the coolant flowing out from the liquid outlet channel 12c may fall freely into the liquid return groove 12d. In other words, when the liquid outlet groove and the liquid return groove 12d are respectively located at opposite ends of the stator core 13 in a radial direction, and the motor 10 is located at a mounting position, the liquid outlet groove is located at the top of the motor 10, and the liquid return groove 12d is located at the bottom of the motor 10. Alternatively, the liquid outlet channel 12c may be in communication with the liquid return groove 12d through a pipeline, and the coolant flowing out from the liquid outlet channel 12c may flow into the liquid return groove 12d through the pipeline. In this case, relative positions of the liquid outlet channel 12c and the liquid return groove 12d are not limited as described above. In this implementation, since the liquid return groove 12d contains higher-temperature coolant, but lower-temperature coolant flows in the liquid inlet channels 12a in the channel A and the channel B and the first distribution grooves 12b1 in communication with the liquid inlet channels 12a, to avoid heat dissipation affected by encounter and mixing of the higher-temperature coolant and the lower-temperature coolant, the liquid inlet channel 12a in the channel A and the first distribution groove 12b1 in communication with the liquid inlet channel 12a may be provided on one side of the liquid return groove 12d and spaced from the liquid return groove 12d, and the liquid inlet channel 12a in the channel B and the first distribution groove 12b1 in communication with the liquid inlet channel 12a are provided on the other side of the liquid return groove 12d and spaced from the liquid return groove 12d.

Figure 19:
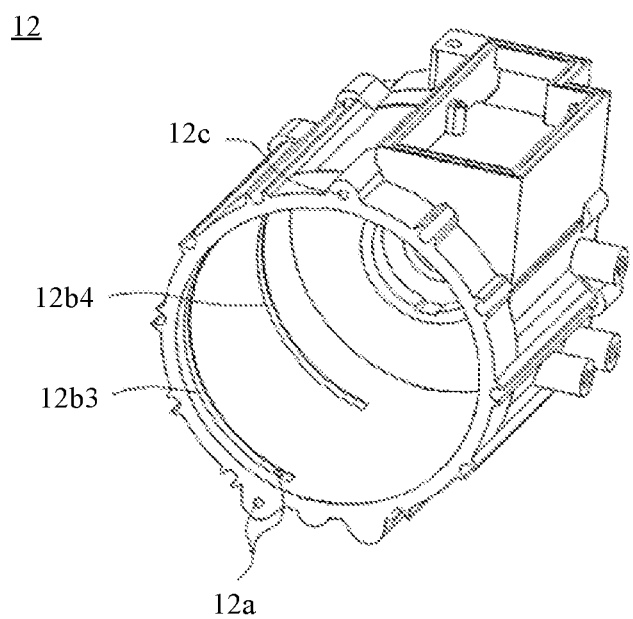
FIG. 19 is a schematic three-dimensional structural view of a motor housing in a seventh implementation according to an embodiment of this application.
Figure 20:
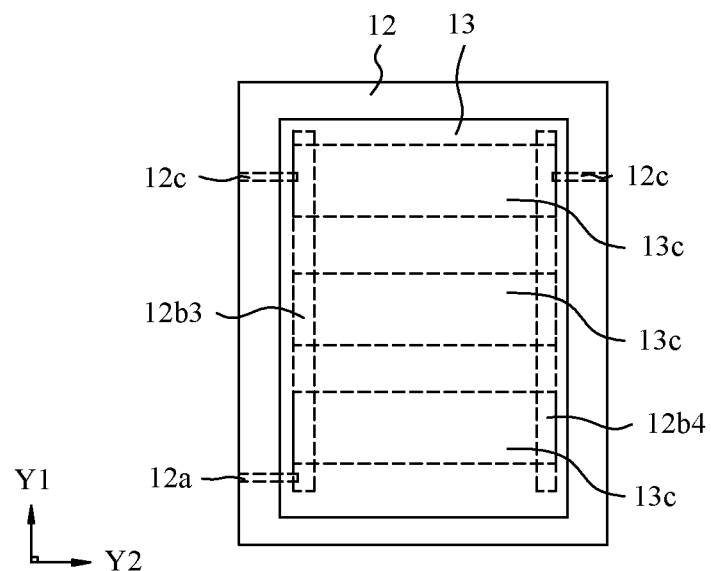
FIG. 20 is a schematic view of circumferential expansion of a motor housing and a stator core in a seventh implementation according to an embodiment of this application.

As shown in FIG. 19 and FIG. 20, in a seventh implementation, different from the foregoing implementations, the distribution groove may include a first distribution groove 12b3 and a second distribution groove 12b4. The first distribution groove 12b3 and the second distribution groove 12b4 both extend around an axis of the stator core 13, and opposite ends of the first distribution groove 12b3 and the second distribution groove 12b4 are spaced apart in extension directions (namely, not enclosed to form a closed loop). The first distribution groove 12b3 and the second distribution groove 12b4 are spaced apart on opposite ends of the inner wall along the axis direction. The liquid inlet channel 12a is in communication with the first distribution groove 12b3 and the outer space of the motor housing 12, and the liquid inlet channel 12a may be located at one end of the first distribution groove 12b3. Several stator grooves 13c (for example, three shown in FIG. 20) are spaced apart and are all located between the first distribution groove 12b3 and the second distribution groove 12b4 and in communication with the first distribution groove 12b3 and the second distribution groove 12b4. One stator groove 13c is in communication with the liquid outlet channel 12c. An extension direction of at least a part of the stator groove 13c intersects an extension direction of at least one of the first distribution groove 12b3 and the second distribution groove 12b4. For example, the first distribution groove 12b3 and the second distribution groove 12b4 may both extend along the circumferential direction of the stator core 13. The extension direction of the stator groove 13c may be the axial direction of the stator core 13, and the stator groove 13c intersects extension directions of the first distribution groove 12b3 and the second distribution groove 12b4. In other implementations, the first distribution groove 12b3 and/or the second distribution groove 12b4 may extend along another suitable direction. For example, the first distribution groove 12b3 and/or the second distribution groove 12*b*4 may extend like a spiral on the inner wall of the motor housing 12. The stator groove 13*c* may have an extension direction adapted to the stator groove 13*c*. For example, at least one stator groove 13*c* may extend along a direction at an acute angle to the axial direction. The first distribution groove 12*b*3 and/or the second distribution groove 12*b*4 may alternatively enclose to form a closed loop. There may be one stator core 13.

As shown in FIG. 20, in this seventh implementation, the liquid inlet channel 12*a*, the first distribution groove 12*b*3, the stator groove 13*c*, the second distribution groove 12*b*4, and the liquid outlet channel 12*c* are sequentially in communication to form a coolant channel. When entering the first distribution groove 12*b*3 from the liquid inlet channel 12*a*, the coolant flows into each stator groove 13*c* while flowing in the first distribution groove 12*b*3, and flows into the second distribution groove 12*b*4 through each stator groove 13*c*. In the first distribution groove 12*b*3 and the second distribution groove 12*b*4, the coolant flows unidirectionally from one end to the other end. When flowing into the stator groove 13*c* in communication with the liquid outlet channel 12*c*, the coolant flows out from the stator core 13 through the liquid outlet channel 12*c*. In other implementations, when the first distribution groove 12*b*3 or the second distribution groove 12*b*4 or both are enclosed to form a closed loop, the coolant may flow bidirectionally in the closed loop. When the coolant flows in the stator groove 13*c*, the stator core 13 may be cooled by heat exchange. With reference to FIG. 1 and FIG. 20, after flowing out from the stator core 13 through the liquid outlet channel 12*c*, the coolant may be sprayed to an end portion of the stator winding 14 (when the liquid outlet channel 12*c* is located at the top in the view of FIG. 1) to further dissipate heat for the stator winding 14. In this implementation, a brand-new channel design solution is developed, which not only has the technical effects of the foregoing implementations, but also can meet heat dissipation requirements of motors 10 with different structures. In other implementations, the second distribution groove 12*b*4 may not be provided, but each stator groove 13*c* in communication with the first distribution groove 12*b*3 needs to be in communication with the liquid outlet channel 12*c*, so that the coolant is distributed from the first distribution groove 12*b*3 to each stator groove 13*c*, and flows out through the liquid outlet channel 12*c* corresponding to each stator groove 13*c*.

Figure 21:
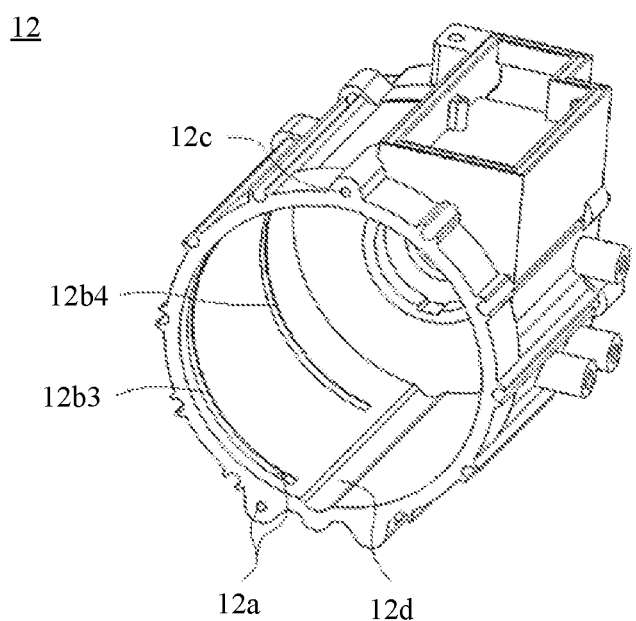
FIG. 21 is a schematic three-dimensional structural view of a motor housing in an eighth implementation according to an embodiment of this application.
Figure 22:
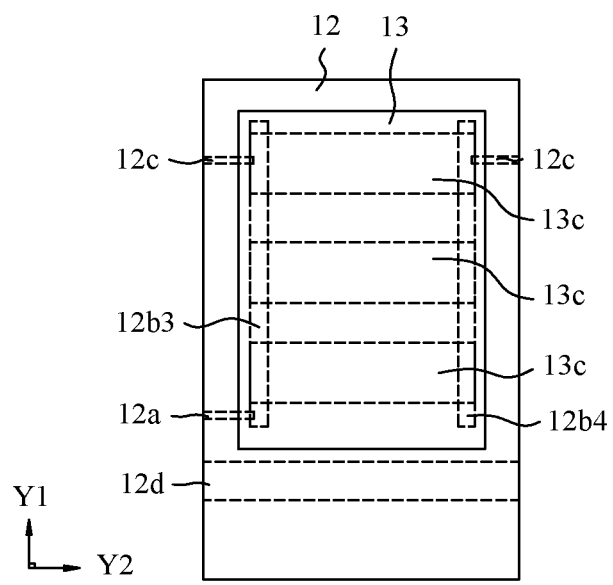
FIG. 22 is a schematic view of circumferential expansion of a motor housing and a stator core in an eighth implementation according to an embodiment of this application.

As shown in FIG. 21 and FIG. 22, in this eighth implementation, based on the seventh implementation, the inner wall of the motor housing 12 may be further provided with a liquid return groove 12*d*, and opposite ends of the liquid return groove 12*d* in an extension direction extend beyond the stator core 13. In this implementation, the opposite ends of the liquid return groove 12*d* may both penetrate an axial end face of the motor housing 12, or certainly at least one end may not penetrate an axial end face of the motor housing 12. The extension direction of the liquid return groove 12*d* is the axial direction of the stator core 13, or certainly may be another suitable direction, for example, a direction at an acute angle to the axial direction. The liquid return groove 12*d* may be a straight groove or a non-straight groove. The liquid return groove 12*d* may be in communication with a heat exchanger, and the liquid return groove 12*d* is used to receive coolant flowing out from the liquid outlet channel 12*c*, and deliver the coolant to the heat exchanger for cooling. A temperature of the cooled coolant decreases and the coolant may be reused for heat dissipation. In this implementation, the coolant flowing out from the liquid outlet channel 12*c* may fall freely into the liquid return groove 12*d*. In other words, when the liquid outlet groove and the liquid return groove 12*d* are respectively located at opposite ends of the stator core 13 in a radial direction, and the motor 10 is located at a mounting position, the liquid outlet groove is located at the top of the motor 10, and the liquid return groove 12*d* is located at the bottom of the motor 10. Alternatively, the liquid outlet channel 12*c* may be in communication with the liquid return groove 12*d* through a pipeline, and the coolant flowing out from the liquid outlet channel 12*c* may flow into the liquid return groove 12*d* through the pipeline. In this case, relative positions of the liquid outlet channel 12*c* and the liquid return groove 12*d* are not limited as described above. In this implementation, since the liquid return groove 12*d* contains higher-temperature coolant, but lower-temperature coolant flows in the first distribution groove 12*b*3 and the second distribution groove 12*b*4, to avoid heat dissipation affected by encounter and mixing of the higher-temperature coolant and the lower-temperature coolant, the liquid return groove 12*d* may pass between opposite ends of the first distribution groove 12*b*3 and opposite ends of the second distribution groove 12*b*4, the opposite ends of the first distribution groove 12*b*3 are kept spaced from the liquid return groove 12*d*, and the opposite ends of the second distribution groove 12*b*4 are also spaced from the liquid return groove 12*d*.

Figure 23:
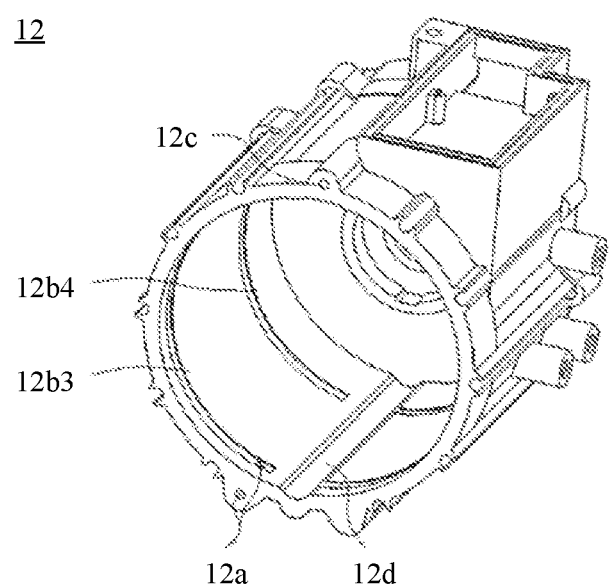
FIG. 23 is a schematic three-dimensional structural view of a motor housing in another implementation according to an embodiment of this application.
Figure 24:
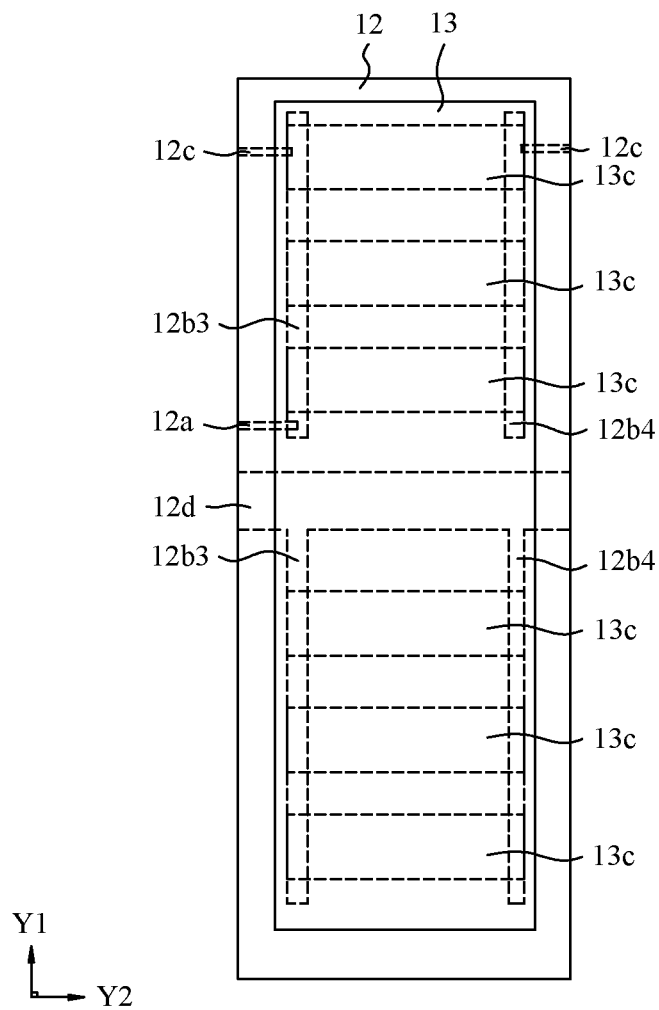
FIG. 24 is a schematic view of circumferential expansion of a motor housing and a stator core in the implementation shown in FIG. 23.

Alternatively, as shown in FIG. 23 and FIG. 24, in other implementations, different from the eighth implementation, the first distribution groove 12*b*3 and the second distribution groove 12*b*4 are basically around an axis of the stator core 13, and a spacing between the opposite ends of the first distribution groove 12*b*3 and the second distribution groove 12*b*4 is relatively small. One end that is of the first distribution groove 12*b*3 and on which the liquid inlet channel 12*a* is not provided is in communication with the liquid return groove 12*d*, and one end of the second distribution groove 12*b*4 is also in communication with the liquid return groove 12*d*. The end portion of the first distribution groove 12*b*3 and the end portion of the second distribution groove 12*b*4 are located on a same side of the liquid return groove 12*d*. In this way, the coolant is divided into two paths at the liquid outlet channel 12*c*, where one path flows out from the stator core 13 through the liquid outlet channel 12*c* and enters the liquid return groove 12*d*, and the other path continues to flow in the first distribution groove 12*b*3 along the original flow direction, flows into the second distribution groove 12*b*4 through the stator groove 13*c*, and finally merges into the liquid return groove 12*d*. In this implementation, a brand-new channel design solution is developed, and heat dissipation requirements of motors 10 with different structures can be met. Certainly, on the premise that one end that is of the first distribution groove 12*b*3 and on which the liquid inlet channel 12*a* is not provided is in communication with the liquid return groove 12*d*, and one end of the liquid inlet channel 12*a* is spaced from the liquid return groove 12*d*, the opposite ends of the second distribution groove 12*b*4 may also be in communication with the liquid return groove 12*d*.

Figure 25:
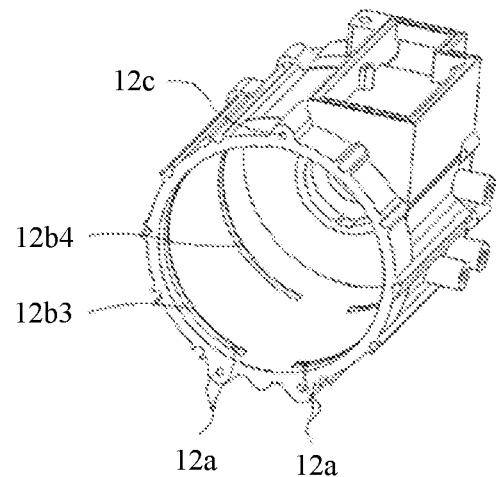
FIG. 25 is a schematic three-dimensional structural view of a motor housing in a ninth implementation according to an embodiment of this application.
Figure 26:
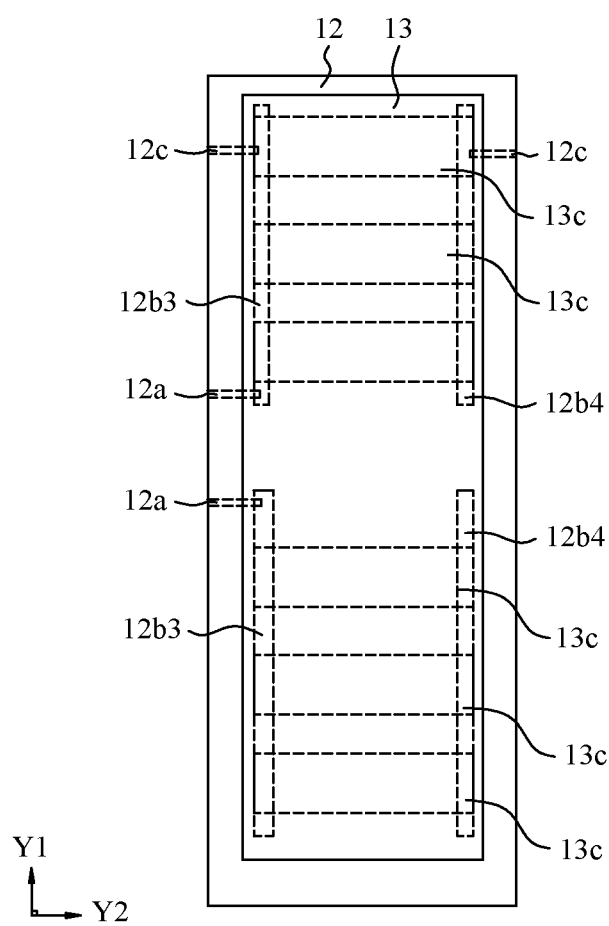
FIG. 26 is a schematic view of circumferential expansion of a motor housing and a stator core in a ninth implementation according to an embodiment of this application.

As shown in FIG. 25 and FIG. 26, in a ninth implementation, different from the seventh implementation, the motor housing 12 is provided with two liquid inlet channels 12*a* spaced apart, opposite ends of the first distribution groove 12*b*3 in an extension direction are spaced apart, and each end is in communication with one liquid inlet channel 12*a*. In the first distribution groove 12*b*3 and the second distribution groove 12*b*4, the coolant flows bidirectionally from two ends to the middle. Specifically, the two paths of coolant enter the opposite ends of the first distribution groove 12*b*3 from the two liquid inlet channels 12a respectively, where one path flows in the first distribution groove 12b3 clockwise, and the other path flows in the first distribution groove 12b3 counterclockwise. The two paths of coolant in the first distribution groove 12b3 may flow into the second distribution groove 12b4 through the stator groove 13c, and flow in the second distribution groove 12b4 from two ends to the middle. When the two paths of coolant in the first distribution groove 12b3 and the second distribution groove 12b4 flow into the stator groove 13c in communication with the liquid outlet channel 12c, the coolant may flow out from the stator core 13 through the liquid outlet groove. In this implementation, the first distribution groove 12b3 and the second distribution groove 12b4 both serve as parallel channels, and the coolant flows along opposite directions in the parallel channels, so that the coolant can be distributed to the stator grooves 13c more rapidly, to implement rapid heat dissipation of the stator core 13.

Figure 27:
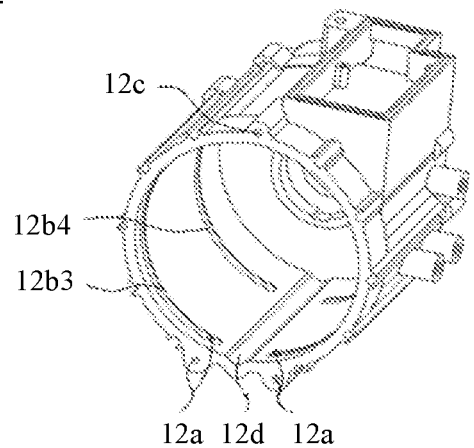
FIG. 27 is a schematic three-dimensional structural view of a motor housing in a tenth implementation according to an embodiment of this application.
Figure 28:
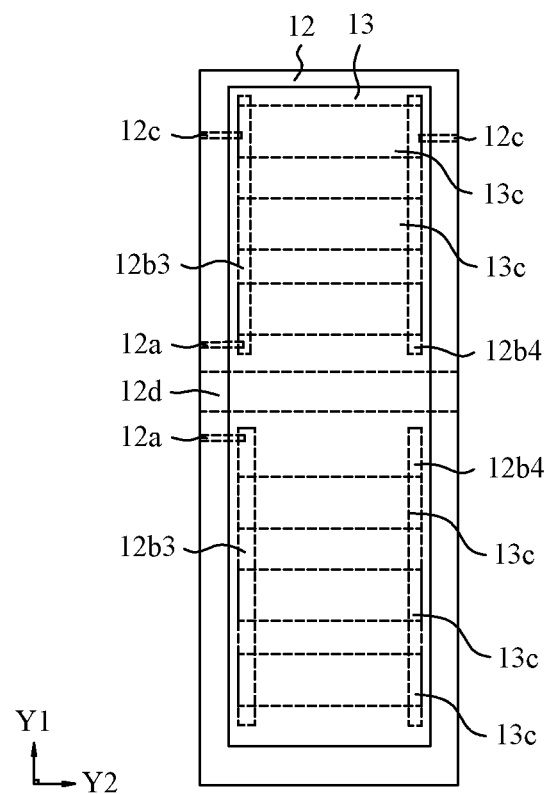
FIG. 28 is a schematic view of circumferential expansion of a motor housing and a stator core in a tenth implementation according to an embodiment of this application.

As shown in FIG. 27 and FIG. 28, in a tenth implementation, based on the ninth implementation, the inner wall of the motor housing 12 may be further provided with a liquid return groove 12d, and opposite ends of the liquid return groove 12d in an extension direction extend beyond the stator core 13. In this implementation, the opposite ends of the liquid return groove 12d may penetrate an axial end face of the motor housing 12, or certainly at least one end may not penetrate an axial end face of the motor housing 12. The extension direction of the liquid return groove 12d is the axial direction of the stator core 13, or certainly may be another suitable direction, for example, a direction at an acute angle to the axial direction. The liquid return groove 12d may be a straight groove or a non-straight groove. The liquid return groove 12d may be in communication with a heat exchanger, and the liquid return groove 12d is used to receive coolant flowing out from the liquid outlet channel 12c, and deliver the coolant to the heat exchanger for cooling. A temperature of the cooled coolant decreases and the coolant may be reused for heat dissipation. In this implementation, the coolant flowing out from the liquid outlet channel 12c may fall freely into the liquid return groove 12d. In other words, when the liquid outlet groove and the liquid return groove 12d are respectively located at opposite ends of the stator core 13 in a radial direction, and the motor 10 is located at a mounting position, the liquid outlet groove is located at the top of the motor 10, and the liquid return groove 12d is located at the bottom of the motor 10. Alternatively, the liquid outlet channel 12c may be in communication with the liquid return groove 12d through a pipeline, and the coolant flowing out from the liquid outlet channel 12c may flow into the liquid return groove 12d through the pipeline. In this case, relative positions of the liquid outlet channel 12c and the liquid return groove 12d are not limited as described above. In this implementation, since the liquid return groove 12d contains higher-temperature coolant, but lower-temperature coolant flows in the first distribution groove 12b3 and the second distribution groove 12b4, to avoid heat dissipation affected by encounter and mixing of the higher-temperature coolant and the lower-temperature coolant, the liquid return groove 12d may pass between opposite ends of the first distribution groove 12b3 and opposite ends of the second distribution groove 12b4, the opposite ends of the first distribution groove 12b3 are kept spaced from the liquid return groove 12d, the two liquid inlet channels 12a are both spaced from the liquid return groove 12d, and the opposite ends of the second distribution groove 12b4 are also spaced from the liquid return groove 12d. Certainly, at least one end of the second distribution groove 12b4 may also be in communication with the liquid return groove 12d.

Figure 29:
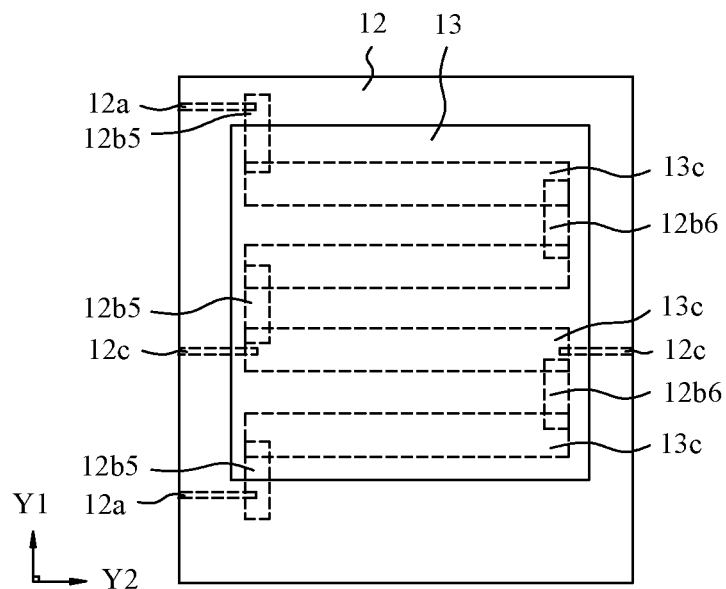
FIG. 29 is a schematic view of circumferential expansion of a motor housing and a stator core in an eleventh implementation according to an embodiment of this application.

As shown in FIG. 29, in an eleventh implementation, different from the foregoing implementations, the inner wall of the motor housing 12 is provided with a first set of distribution grooves and a second set of distribution grooves. The first set of distribution grooves includes several first distribution grooves 12b5 and are distributed at one end of the inner wall of the motor housing 12 along the axial direction. The second set of distribution grooves includes several second distribution grooves 12b6 and are distributed at the other end of the inner wall of the motor housing 12 along the axial direction Y2. The first distribution grooves 12b5 in the first set of distribution grooves are sequentially spaced around the axis of the stator core 13, and the second distribution grooves 12b6 in the second set of distribution grooves are also sequentially spaced around the axis of the stator core 13. In addition, the first distribution groove 12b5 and the second distribution groove 12b6 are alternately distributed in the circumferential direction Y1 of the stator core 13. In other words, one second distribution groove 12b6 is provided between every two adjacent first distribution grooves 12b5, the second distribution groove 12b6 is spaced from both the two first distribution grooves 12b5, one first distribution groove 12b5 is provided between every two adjacent second distribution grooves 12b6, and the first distribution groove 12b5 is spaced from both the two second distribution grooves 12b6. There may be at least one liquid inlet channel 12a, and one liquid inlet channel 12a is correspondingly in communication with one first distribution groove 12b5. There are also several stator grooves 13c, and one stator groove 13c is distributed between every adjacent first distribution groove 12b5 and second distribution groove 12b6. The stator groove 13c is in communication with both the first distribution groove 12b5 and the second distribution groove 12b6. An extension direction of at least a part of the stator groove 13c intersects an extension direction of at least a part of the first distribution groove 12b5, and/or an extension direction of at least a part of the stator groove 13c intersects an extension direction of at least a part of the second distribution groove 12b6. For example, the first distribution groove 12b5 and the second distribution groove 12b6 may both extend along the circumferential direction of the stator core 13, the extension direction of the stator groove 13c may be the axial direction of the stator core 13, and the stator groove 13c intersects extension directions of the first distribution groove 12b5 and the second distribution groove 12b6. In other implementations, a single first distribution groove 12b5 and/or a single second distribution groove 12b6 may extend along another suitable direction. For example, a single first distribution groove 12b5 and/or a single second distribution groove 12b6 may extend like a spiral on the inner wall of the motor housing 12. A single stator groove 13c may have an extension direction adapted to the single stator groove 13c. For example, the single stator groove 13c may extend along a direction at an acute angle to the axial direction. There may be at least one liquid outlet channel 12c, and all liquid outlet channels 12c may be in communication with one stator groove 13c.

As shown in FIG. 29, in this eleventh implementation, the coolant is distributed to the stator groove 13c after entering the first distribution groove 12b5 from the liquid inlet channel 12a, flows from one end of the stator groove 13c to the other end and enters the second distribution groove 12b6, and then re-enters the stator groove 13c through the second distribution groove 12b6 and flows along a direction opposite to the flow direction in the previous stator groove 13c to re-enter the first distribution groove 12b5. This circulates until the coolant flows into the liquid outlet channel 12c, and flows out from the stator core 13 through the liquid outlet channel 12c. When the coolant flows in the stator groove 13c, the stator core 13 may be cooled by heat exchange. With reference to FIG. 1 and FIG. 29, after flowing out from the stator core 13 through the liquid outlet channel 12c, the coolant may be sprayed to an end portion of the stator winding 14 (when the liquid outlet channel 12c is located at the top in the view of FIG. 1) to further dissipate heat for the stator winding 14. In this implementation, a brand-new channel design solution is developed, which not only has the technical effects of the foregoing implementations, but also can meet heat dissipation requirements of motors 10 with different structures.

The motor 10 of this embodiment has been described in detail above, and a motor cooling system including the motor 10 will be described below.

Figure 30:
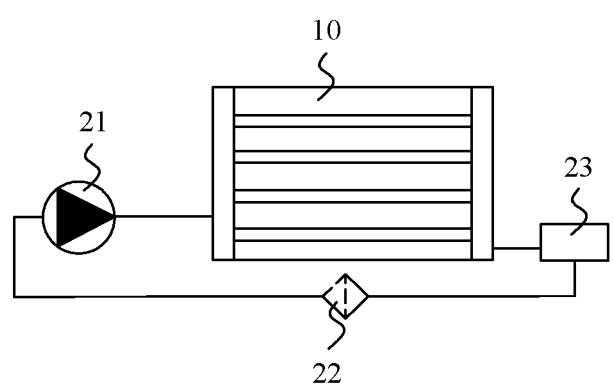
FIG. 30 is a schematic structural view of a motor cooling system according to an embodiment of this application.

As shown in FIG. 30, the motor cooling system 20 of this embodiment may include a heat exchanger 23, a delivery device 21, and the motor 10 in any one of the foregoing implementations. The heat exchanger 23 is configured to receive coolant flowing out from a liquid outlet channel 12c of the motor 10, and cool the coolant. For a solution in which no liquid return groove 12d is provided, the heat exchanger 23 may directly receive the coolant from the liquid outlet channel 12c. For a solution in which a liquid return groove 12d is provided, the heat exchanger 23 may receive the coolant from the liquid return groove 12d. The heat exchanger 23 has a flowing cold fluid, and the cold fluid absorbs heat of higher-temperature coolant through heat exchange, to implement heat exchange and cooling of the coolant, so that the coolant can be reused. The heat exchanger 23 includes but is not limited to an oil-water heat exchanger. To be specific, water is used as a cold fluid to perform heat exchange and cooling on cooling oil. The delivery device 21 is in communication with the heat exchanger 23 and the liquid inlet channel 12a, and is configured to receive the coolant cooled by the heat exchanger 23 through heat exchange, and re-deliver the coolant to the distribution groove through the liquid inlet channel 12a. The delivery device 21 can further provide power to drive the coolant to flow in channels within the motor 10. The delivery device 21 includes but is not limited to an electronic oil pump. The motor cooling system of this embodiment not only can effectively dissipate heat for a stator of the motor 10, but also can implement cyclic utilization of the coolant. It should be understood that the objective of FIG. 30 is merely to schematically describe a connection relationship among the heat exchanger 23, the delivery device 21, and the motor 10, but is not to specifically limit connection locations, specific configurations, and quantities of the devices.

As shown in FIG. 30, to filter lower-temperature coolant flowing into the delivery device 21 and prevent impurities from entering the delivery device 21, a filter 22 may be further disposed between the heat exchanger 23 and the delivery device 21. The filter 22 may be an electric device having a filtering function, or may simply be a mechanical component (for example, a filter screen or a filter element). Certainly, a filter 22 may alternatively be disposed between the motor 10 and the heat exchanger 23, to filter higher-temperature coolant entering the heat exchanger 23, and/or a filter 22 may alternatively be disposed between the delivery device 21 and the motor 10 to filter lower-temperature coolant entering the distribution groove. Certainly, the filter 22 is not necessary in this embodiment.

Figure 31:
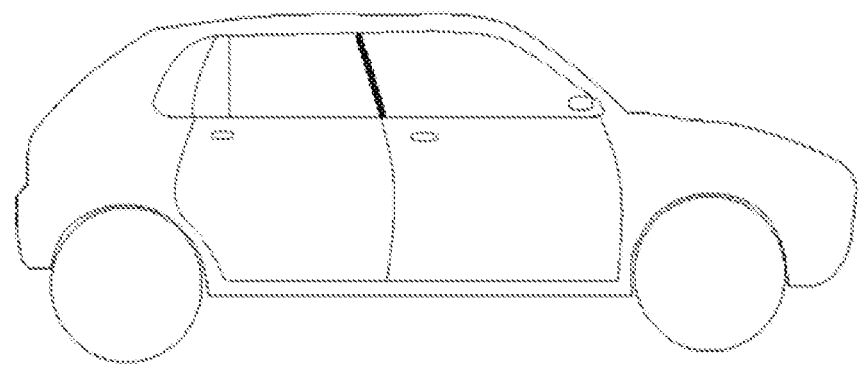
FIG. 31 is a schematic view of an overall structure of an electric vehicle according to an embodiment of this application.
Figure 32:
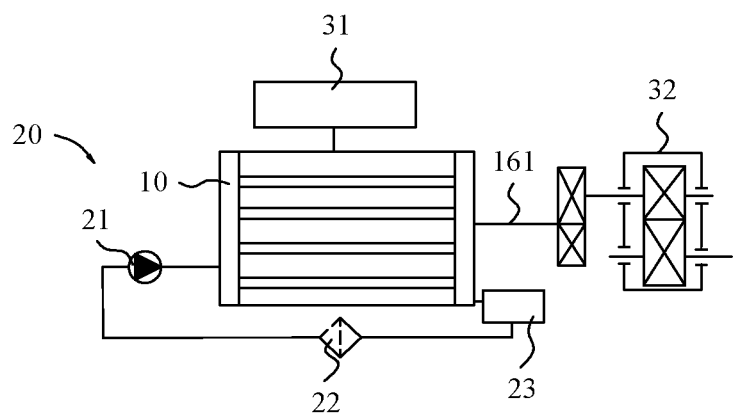
FIG. 32 is a schematic view showing a connection relationship among a motor controller, a gearbox, and a motor cooling system of the electric vehicle shown in FIG. 31.

This embodiment further provides an electric vehicle. The electric vehicle includes but is not limited to a vehicle such as an electric car, an electric bus, and an electric motorcycle. For example, FIG. 31 shows an electric SUV (Sport Utility Vehicle, sport utility vehicle) 30. With reference to FIG. 32, the electric vehicle may include a motor controller 31, a gearbox 32, and the motor cooling system 20 described above. The motor controller 31 is connected to the motor 10, and is configured to control the motor 10 to operate. The gearbox 32 is connected to a motor shaft 161 of the motor 10, and is configured to transmit a torque output by the motor 10 to another mechanical device. In the electric vehicle of this embodiment, a stator core of the motor 10 can achieve effective and continuous heat dissipation, and has high operation reliability. Therefore, vehicle performance is ensured.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A motor, comprising:
    a motor housing and a stator core mounted in the motor housing, wherein
    the motor housing is provided with a distribution groove, a liquid inlet channel, and a liquid outlet channel, the distribution groove is provided on an inner wall of the motor housing, wherein the distribution groove comprises a first distribution groove and two second distribution grooves, in an axial direction of the stator core, the first distribution groove is located between the two second distribution grooves, and in a circumferential direction of the stator core, the first distribution groove is spaced from the two second distribution grooves,
    the liquid inlet channel is in communication with the first distribution groove and an outer space of the motor housing, and the liquid outlet channel is in communication with an inner cavity of the motor housing and the outer space of the motor housing; and
    an outer wall of the stator core is provided with two stator grooves that are spaced apart, an extension direction of at least a part of the stator grooves intersects an extension direction of at least a part of the distribution grooves, and opposite ends of each stator groove in the extension direction of the stator groove are both closed; wherein
    the stator groove is in communication with both the distribution groove and the liquid outlet channel; and
    the liquid inlet channel, the first distribution groove, one of the stator grooves, the two second distribution grooves, the other of the stator grooves, and the liquid outlet channel are in communication to form a coolant channel.

2. The motor according to claim 1, wherein
    the distribution groove comprises two first distribution grooves;
    the liquid inlet channel is in communication with one first distribution groove and the outer space of the motor housing;

the stator groove comprises first, second, and third stator grooves sequentially spaced apart along the circumferential direction of the stator core; and the one first distribution groove in communication with the liquid inlet channel is in communication with the two second distribution grooves through the first stator groove, the two second distribution grooves are in communication with an other of the two first distribution grooves through the second stator groove, and the other of the two first distribution grooves is in communication with the liquid outlet channel through the third stator groove, so that coolant sequentially flows into the liquid inlet channel, the one first distribution groove, the first stator groove, the two second distribution grooves, the second stator groove, the other first distribution groove, the third stator groove, and the liquid outlet channel.

3. The motor according to claim 2, wherein in the axial direction of the stator core, opposite ends of the stator core are both recessed within the motor housing, and one end of the liquid outlet channel extends beyond the stator core;

the inner wall of the motor housing is provided with a liquid return groove, opposite ends of the liquid return groove in an extension direction of the liquid return groove both extend beyond the stator core, and the liquid return groove is used to receive coolant flowing out from the liquid outlet channel and to deliver the coolant to a heat exchanger; and the liquid inlet channel and the one first distribution groove in communication with the liquid inlet channel are both spaced from the liquid return groove.

4. The motor according to claim 3, wherein the motor further comprises several first distribution grooves including the two first distribution grooves, several second distribution grooves including the two second distribution grooves, and several stator grooves including the three stator grooves; and the several first distribution grooves are spaced apart along the circumferential direction of the stator core, two of the several second distribution grooves are provided between every two first distribution grooves of the several first distribution grooves, and each first distribution groove of the several first distribution grooves and two second distribution grooves adjacent thereto are in communication through one stator groove of the three stator grooves; and the two first distribution grooves of the several first distribution grooves are respectively located on the opposite ends of the liquid return groove, wherein the one of the two first distribution grooves is spaced from the liquid return groove, and the other of the two first distribution groove is in communication with the liquid return groove.

5. The motor according to claim 2, wherein the motor comprises a first coolant channel and a second coolant channel, the liquid inlet channel and the one first distribution groove are in communication in the first coolant channel and are spaced from the liquid inlet channel and the other first distribution groove that are in communication in the second coolant channel, and the first and second coolant channels share the third stator groove and the liquid outlet channel, so that the coolant flowing on the inner wall of the motor housing flows into two paths along opposite directions.

6. The motor according to claim 5, wherein in the axial direction of the stator core, opposite ends of the stator core are both recessed within the motor housing, and one end of the liquid outlet channel extends beyond the stator core;

the inner wall of the motor housing is provided with a liquid return groove, opposite ends of the liquid return groove in an extension direction of the liquid return groove both extend beyond the stator core, and the liquid return groove is used to receive coolant flowing out from the liquid outlet channel and serve as a channel for delivering the coolant to a heat exchanger; and the liquid inlet channel and the one first distribution groove that are in communication in the first coolant channel are spaced apart on one side of the liquid return groove, and the liquid inlet channel and the other first distribution groove that are in communication in the second coolant channel are spaced apart on another side of the liquid return groove.

7. The motor according to claim 1, wherein the extension direction of the distribution groove is the circumferential direction of the stator core, and the extension direction of the stator groove is the axial direction of the stator core.

8. The motor according to claim 1, wherein the stator core comprises several iron cores sequentially laminated, a periphery of each iron core is provided with a notch, a portion that is on the iron cores at two ends in an axial direction of the stator core and on which the notch is not provided is aligned with the notch of the iron core adjacent to the iron cores at the two ends of the axial direction of the stator core, and all the notches on the remaining iron cores between the iron cores at the two ends of the axial direction are sequentially in communication to form the stator groove.

9. A motor, comprising:

a motor housing and a stator core mounted in the motor housing, wherein the motor housing is provided with a distribution groove, a liquid inlet channel, and a liquid outlet channel; and the liquid outlet channel is in communication with inner and outer spaces of the motor housing;

the distribution groove is provided on an inner wall of the motor housing, wherein the distribution groove comprises a first distribution groove and a second distribution groove, the first distribution groove and the second distribution groove are both disposed around an axis of the stator core and are spaced apart on opposite ends of the inner wall along the axis direction of the stator core;

an outer wall of the stator core is provided with a stator groove, opposite ends of the stator groove in an extension direction are both closed, the first distribution groove is in communication with the second distribution groove through the stator groove, and the extension direction of the stator groove intersects an extension direction of at least one of the first distribution groove and the second distribution groove;

the liquid inlet channel is in communication with one end of the first distribution groove and the outer space of the motor housing, and the liquid inlet channel, the first distribution groove, the stator groove, the second distribution groove, and the liquid outlet channel are sequentially in communication, to form a coolant channel, so that coolant enters the first distribution groove through the liquid inlet channel, flows into the stator groove while flowing in the first distribution groove, and flows into the second distribution groove and the liquid outlet channel through the stator groove;

in an axial direction of the stator core, opposite ends of the stator core are both recessed within the motor housing, and one end of the liquid outlet channel extends beyond the stator core;

the inner wall of the motor housing is provided with a liquid return groove, opposite ends of the liquid return groove in an extension direction of the liquid return groove both extend beyond the stator core, and the liquid return groove is used to receive coolant flowing out from the liquid outlet channel to deliver the coolant to a heat exchanger; and the first distribution groove is in communication with one end of the liquid inlet channel, and the liquid inlet channel is spaced from the liquid return groove.

10. The motor according to claim 9, wherein the liquid inlet channel of the motor housing comprises two adjacent liquid inlet channels spaced apart, the first distribution groove is comprised of two first distribution grooves having opposing ends where an end of one of the two first distribution grooves is opposing an end of another of the two first distribution grooves, the opposing ends of the two first distribution grooves in an extension direction of the two first distribution grooves are spaced apart, and each end is in communication with one of the two adjacent liquid inlet channels, so that the coolant enters the two first distribution grooves from the two adjacent liquid inlet channels and flows into the stator groove while flowing along opposite directions in the two first distribution grooves.

11. The motor according to claim 10, wherein in an axial direction of the stator core, opposite ends of the stator core are both recessed within the motor housing, and one end of the liquid outlet channel extends beyond the stator core;

the inner wall of the motor housing is provided with a liquid return groove, opposite ends of the liquid return groove in an extension direction of the liquid return groove both extend beyond the stator core, and the liquid return groove is used to receive coolant flowing out from the liquid outlet channel and serves to deliver the coolant to a heat exchanger; and the liquid inlet channel comprises first and second liquid inlet channels and the liquid return groove passes between the first and second liquid inlet channels and between the opposing opposite ends of the first distribution grooves, and is spaced from both the first and second liquid inlet channels and the opposing ends of the two first distribution grooves.

12. A motor cooling system, comprising:

a heat exchanger, a pump and a motor, the motor including a motor housing and a stator core mounted in the motor housing, wherein the motor housing is provided with a distribution groove, a liquid inlet channel, and a liquid outlet channel, the distribution groove is provided on an inner wall of the motor housing, wherein the distribution groove comprises a first distribution groove and two second distribution grooves, in an axial direction of the stator core, the two first distribution grooves are both located between the two second distribution grooves, and in a circumferential direction of the stator core, the first distribution groove is spaced from the two second distribution grooves, the liquid inlet channel is in communication with the first distribution groove and an outer space of the motor housing, and the liquid outlet channel is in communication with an inner cavity of the motor housing and the outer space of the motor housing; and an outer wall of the stator core is provided with two stator grooves that are spaced apart, an extension direction of at least a part of the stator grooves intersects an extension direction of at least a part of the distribution grooves, and opposite ends of each stator groove in the extension direction of the stator groove are both closed; wherein the stator groove is in communication with both the distribution groove and the liquid outlet channel;

the liquid inlet channel, the first distribution groove, one of the stator grooves, the two second distribution grooves, the other of the stator grooves, and the liquid outlet channel are in communication to form a coolant channel;

the heat exchanger is configured to receive and cool coolant flowing out from the liquid outlet channel; and the pump is in communication with the heat exchanger and the liquid inlet channel, and is configured to deliver the cooled coolant from the liquid inlet channel to the distribution groove, and drive the coolant to flow in the coolant channel.

13. The motor cooling system according to claim 12, wherein the distribution groove comprises two first distribution grooves that are spaced apart;

the liquid inlet channel is in communication with one of the two first distribution grooves and the outer space of the motor housing;

the stator groove comprises first, second, and third stator grooves sequentially spaced apart along the circumferential direction of the stator core; and the one first distribution groove in communication with the liquid inlet channel is in communication with the two second distribution grooves through the first stator groove, the two second distribution grooves are in communication with another of the two first distribution grooves through the first stator groove, and the other of the two first distribution grooves is in communication with the liquid outlet channel through the second stator groove, so that coolant sequentially flows into the liquid inlet channel, the one first distribution groove, the first stator groove, the two second distribution grooves, the second stator groove, the other first distribution groove, the third stator groove, and the liquid outlet channel.

14. The motor cooling system according to claim 13, wherein in the axial direction of the stator core, opposite ends of the stator core are both recessed within the motor housing, and one end of the liquid outlet channel extends beyond the stator core;

the inner wall of the motor housing is provided with a liquid return groove, opposite ends of the liquid return groove in an extension direction of the liquid return groove both extend beyond the stator core, and the liquid return groove is used to receive coolant flowing out from the liquid outlet channel and to deliver the coolant to the heat exchanger; and the liquid inlet channel and the one first distribution groove in communication with the liquid inlet channel are both spaced from the liquid return groove.

15. The motor cooling system according to claim 14, wherein the motor further comprises
several first distribution grooves including the two first distribution grooves, several second distribution grooves including the two second distribution grooves, and several stator grooves including the three stator grooves; and
the several first distribution grooves are spaced apart along the circumferential direction of the stator core, two of the several second distribution grooves are provided between every two first distribution grooves of the several first distribution grooves, and each first distribution groove of the several first distribution grooves and two second distribution grooves adjacent thereto are in communication through one stator groove of the three stator grooves; and
the two first distribution grooves of the several first distribution grooves are respectively located on the opposite ends of the liquid return groove, wherein the one of the two first distribution grooves is spaced from the liquid return groove, and the other of the two first distribution grooves is in communication with the liquid return groove.

16. The motor cooling system according to claim 13, wherein
the motor comprises a first coolant channel and a second coolant channel, the liquid inlet channel and the one first distribution groove are in communication in the first coolant channel and are spaced from the liquid inlet channel and the other first distribution groove that are in communication in the second coolant channel, and the first and second coolant channels share the third stator groove and the liquid outlet channel, so that the coolant flowing on the inner wall of the motor housing flows into two paths along opposite directions.

17. The motor cooling system according to claim 16, wherein
in the axial direction of the stator core, opposite ends of the stator core are both recessed within the motor housing, and one end of the liquid outlet channel extends beyond the stator core;
the inner wall of the motor housing is provided with a liquid return groove, opposite ends of the liquid return groove in an extension direction of the liquid return groove both extend beyond the stator core, and the liquid return groove is used to receive coolant flowing out from the liquid outlet channel and serves to deliver the coolant to the heat exchanger; and
the liquid inlet channel and the one first distribution groove that are in communication in the first coolant channel are spaced apart on one side of the liquid return groove, and the liquid inlet channel and the other first distribution groove that are in communication in the second coolant channel are spaced apart on another side of the liquid return groove.

18. An electric vehicle, comprising:
a motor controller, a gearbox, and a motor
wherein the motor comprises
a motor housing and a stator core mounted in the motor housing, wherein
the motor housing is provided with a distribution groove, a liquid inlet channel, and a liquid outlet channel, the distribution groove is provided on an inner wall of the motor housing, wherein the distribution groove comprises a first distribution groove and two second distribution grooves, in an axial direction of the stator core, the two first distribution grooves are both located between the two second distribution grooves, and in a circumferential direction of the stator core, the first distribution groove is spaced from the two second distribution grooves;
the liquid inlet channel is in communication with the first distribution groove and an outer space of the motor housing, and the liquid outlet channel is in communication with an inner cavity of the motor housing and the outer spaces of the motor housing;
an outer wall of the stator core is provided with two stator grooves that are spaced apart, an extension direction of at least a part of the stator grooves intersects an extension direction of at least a part of the distribution grooves, and opposite ends of each stator groove in the extension direction of the stator groove are both closed, wherein
each stator groove is in communication with both the first distribution groove and the liquid outlet channel;
the liquid inlet channel, the first distribution groove, one of the stator grooves, the two second distribution grooves, the other of the stator grooves, and the liquid outlet channel are in communication to form a coolant channel; and
wherein the motor controller is connected to the motor to control the motor to operate, and the gearbox is connected to a motor shaft of the motor.

* * * * *

UNITED STATES PATENT AND TRADEMARK OFFICE
CERTIFICATE OF CORRECTION

| | |
|---|---|
| PATENT NO. | : 11,577,600 B2 |
| APPLICATION NO. | : 17/466137 |
| DATED | : February 14, 2023 |
| INVENTOR(S) | : Jiangang Wang et al. |

It is certified that error appears in the above-identified patent and that said Letters Patent is hereby corrected as shown below:

On the Title Page

In item (56), in Column 2, under "Other Publications", Line 1, delete "wi th" and insert -- with --.

In the Claims

In Column 27, Line 8, in Claim 2, delete "an other" and insert -- another --.

Signed and Sealed this
Eleventh Day of April, 2023

Katherine Kelly Vidal
*Director of the United States Patent and Trademark Office*